(12) United States Patent
Oba

(10) Patent No.: US 11,962,479 B2
(45) Date of Patent: Apr. 16, 2024

(54) ABNORMALITY DETECTION METHOD AND ABNORMALITY DETECTION DEVICE

(71) Applicant: Panasonic Intellectual Property Corporation of America, Torrance, CA (US)

(72) Inventor: Tatsumi Oba, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 385 days.

(21) Appl. No.: 17/221,414

(22) Filed: Apr. 2, 2021

(65) Prior Publication Data

US 2021/0226862 A1    Jul. 22, 2021

Related U.S. Application Data

(63) Continuation of application No. PCT/JP2019/031585, filed on Aug. 9, 2019.

(60) Provisional application No. 62/770,375, filed on Nov. 21, 2018.

(30) Foreign Application Priority Data

Apr. 22, 2019    (JP) .................................. 2019-081275

(51) Int. Cl.
*H04L 43/02*    (2022.01)
*H04L 41/142*    (2022.01)

(52) U.S. Cl.
CPC ............ *H04L 43/02* (2013.01); *H04L 41/142* (2013.01)

(58) Field of Classification Search
None
See application file for complete search history.

(56) References Cited

U.S. PATENT DOCUMENTS

| | | | | |
|---|---|---|---|---|
| 2019/0109714 A1* | 4/2019 | Clark | ..................... | H04L 67/565 |
| 2019/0349309 A1* | 11/2019 | Bonig | ................... | H04W 4/023 |
| 2020/0322248 A1* | 10/2020 | Carson | ................... | H04L 41/142 |
| 2021/0168083 A1* | 6/2021 | Somu | ................... | H04L 47/2441 |

OTHER PUBLICATIONS

F. Abbasi, Detection and classification of malicious network streams in honeynets, pp. 1-196 (Year: 2013).*

Karim Mohammed Rezaul and Vic Grout, An Overview of Long-range Dependent Network Traffic Engineering and Analysis: Characteristics, Simulation, Modelling and Control, pp. 1-10 (Year: 2007).*

A. Kribel, Detection of Anomalies in the Traffic of Information and Telecommunication Networks Based on the Assessment of its Self-Similarity, pp. 1-6 (Year: 2020).*

(Continued)

*Primary Examiner* — Christopher M Crutchfield

(74) *Attorney, Agent, or Firm* — Wenderoth, Lind & Ponack, L.L.P.

(57) ABSTRACT

In an abnormality detection method, for a detection target packet stream made up of a plurality of detection target packets that are consecutive, a plurality of distances between the plurality of detection target packets are calculated, a feature amount of the detection target packet stream is extracted using the plurality of distances calculated, and information about the degree of abnormality in the detection target packet stream is calculated using the extracted feature amount.

12 Claims, 21 Drawing Sheets

(56) References Cited

OTHER PUBLICATIONS

W. Schleifer, On-line Error Detection through Observation of Traffic Self-Similarity, pp. 1-14 (Year: 2001).*

H. Kwon, Self-similarity Based Lightweight Intrusion Detection Method for Cloud Computing, pp. 1-10 (Year: 2011).*

Extended European Search Report dated Dec. 1, 2021 in corresponding European Patent Application No. 19886211.2.

Abbasi et al., "Detection and classification of malicious network streams in honeynets", A thesis presented in partial fulfilment of the requirements for the degree of Doctor of Philosophy in Computer Science, Dec. 2013.

Miller et al., "Anomalous Network Packet Detection Using Data Stream Mining", Journal of Information Security, [Online] vol. 2, No. 4, Oct. 2011, pp. 158-168.

International Search Report (ISR) dated Oct. 15, 2019 in International (PCT) Application No. PCT/JP2019/031585.

Nong Ye, "A Markov Chain Model of Temporal Behavior for Anomaly Detection", Proceedings of the 2000 IEEE, Workshop on Information Assurance and Security, Jun. 2000, pp. 171-174.

Matthew Eric Otey, et al., "Fast Distributed Outlier Detection in Mixed-Attribute Data Sets", Data Mining and Knowledge Discovery, Apr. 2006, pp. 203-228.

Marco Cuturi, et al., "A Kernel for Time Series Based on Global Alignments", 2007 IEEE International Conference on Acoustics, Speech and Signal Processing—ICASSP 2007, Apr. 2007, pp. II-413-II-416.

* cited by examiner

FIG. 2

| PROFILE ID | SOURCE IP | TARGET PROTOCOL | TARGET COMMAND | |
|---|---|---|---|---|
| 1 | 192.168.0.1 | BACnet/IP | WRITE COMMAND | ... |
| 2 | 192.168.0.1 | BACnet/IP | READ COMMAND | ... |
| 3 | 192.168.0.2 | BACnet/IP | STATUS NOTIFICATION COMMAND | ... |
| 4 | 192.168.0.3 | BACnet/IP | STATUS NOTIFICATION COMMAND | ... |

FIG. 18

|   | 2  | 5  | 4  | 2  |
|---|----|----|----|----|
| 2 | +0 | +3 | +2 | +0 |
| 2 | +0 | +3 | +2 | +0 |
| 5 | +3 | +0 → | +1 | +3 |
| 1 | +1 | +4 | +3 | +1 →= 2 (DISTANCE) |

ABNORMALITY DETECTION METHOD AND ABNORMALITY DETECTION DEVICE

CROSS REFERENCE TO RELATED APPLICATIONS

This application is a U.S. continuation application of PCT International Patent Application Number PCT/JP2019/031585 filed on Aug. 9, 2019, claiming the benefit of priority of U.S. Provisional Patent Application No. 62/770,375 filed on Nov. 21, 2018, and Japanese Patent Application Number 2019-081275 filed on Apr. 22, 2019, the entire contents of which are hereby incorporated by reference.

BACKGROUND

1. Technical Field

The present disclosure relates to abnormality detection methods and devices for detecting an abnormality in a packet stream.

2. Description of the Related Art

A conventionally known information processing technique is applied to data that is used in a network system or the like (for example, refer to Ye, N. (2000, June). A markov chain model of temporal behavior for anomaly detection. In Proceedings of the 2000 IEEE Systems, Man, and Cybernetics Information Assurance and Security Workshop (Vol. 166, p. 169). West Point, NY (Non Patent Literature (NPL) 1) and Otey, M. E., Ghoting, A., & Parthasarathy, S. (2006). Fast distributed outlier detection in mixed-attribute data sets. Data mining and knowledge discovery, 12(2-3), 203-228 (NPL 2)).

SUMMARY

Detection of an abnormality in a packet stream that is used in a network system or the like is desired.

Thus, the present disclosure has an object to provide an abnormality detection method and device for detecting an abnormality in a packet stream.

An abnormality detection method according to one aspect of the present disclosure includes: calculating, for a detection target packet stream made up of a plurality of detection target packets that are consecutive, a plurality of distances between the plurality of detection target packets; extracting a feature amount of the detection target packet stream using the plurality of distances calculated; and calculating information about a degree of abnormality in the detection target packet stream using the feature amount extracted.

Furthermore, an abnormality detection device according to one aspect of the present disclosure includes: a detection target packet data distance calculator that calculates, for a detection target packet stream made up of a plurality of detection target packets that are consecutive, a plurality of distances between the plurality of detection target packets; a feature amount extractor that extracts a feature amount of the detection target packet stream using the plurality of distances calculated; and an information calculator that calculates information about a degree of abnormality in the detection target packet stream using the feature amount extracted.

With the abnormality detection method and device according to one aspect of the present disclosure, it is possible to detect an abnormality in a packet stream.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a schematic diagram illustrating one example of profile information;

FIG. 18 is a schematic diagram illustrating one example where an information calculator according to Embodiment 2 calculates a dynamic time warping distance;

Figure 1:
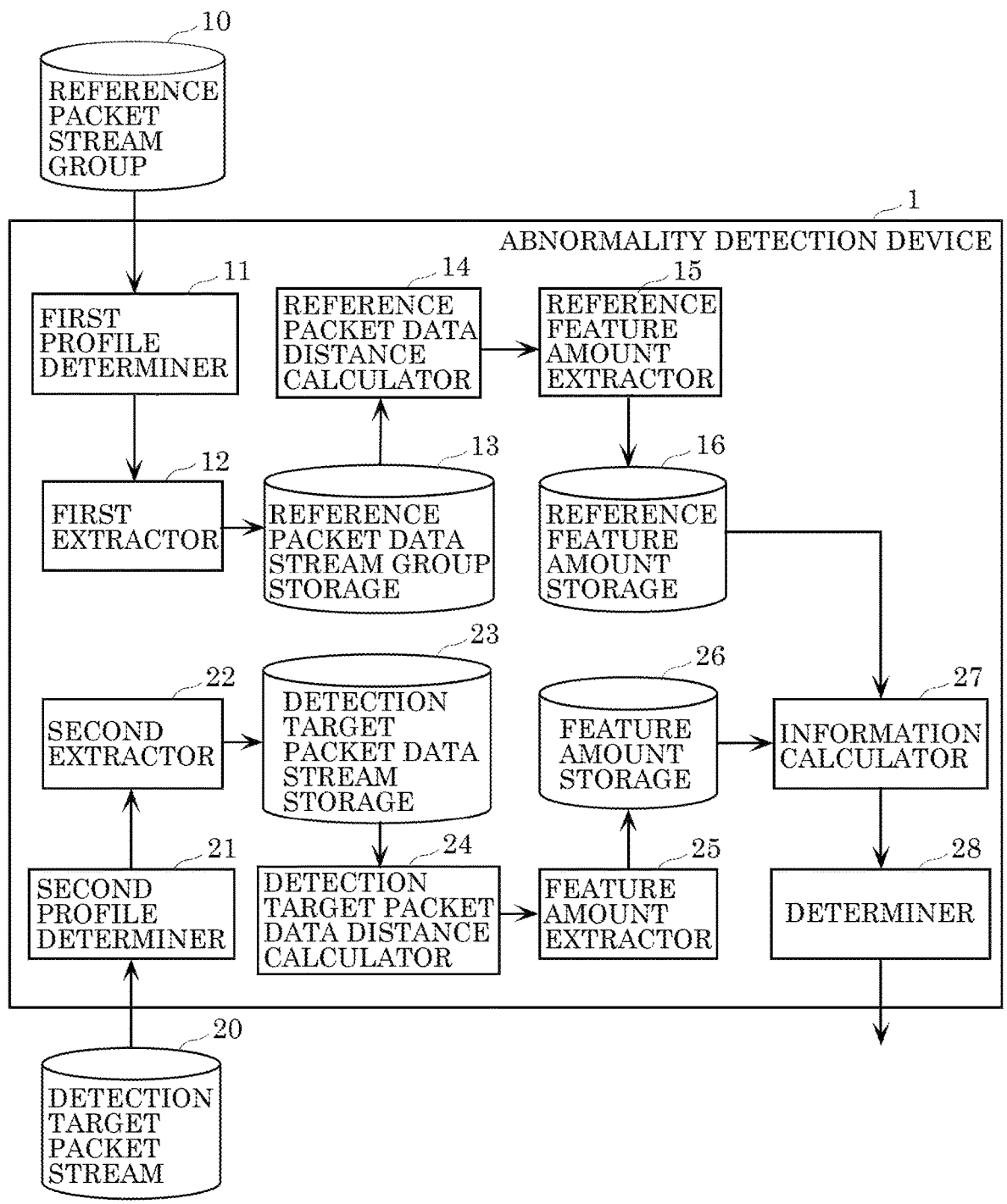
FIG. 1 is a block diagram illustrating the configuration of an abnormality detection device according to Embodiment 1.

DETAILED DESCRIPTION OF THE EMBODIMENTS (Underlying Knowledge Forming Basis of One Aspect of the Present Invention)

Conventionally, there is a tendency that cyber-attack cases in industrial control systems (ICSs) increase. In the ICSs, a command string in a normal format for controlling a device could become a serious attack, and even an abnormal packet stream generated by a malicious attacker is almost indistinguishable from a normal packet stream when checked on a per-packet basis.

Conventionally known methods for detecting an abnormality in a packet stream include a rule-based approach and an anomaly-based approach. However, the rule-based approach is problematic in that it is difficult to detect an abnormality in a packet stream that is not described according to a rule, and the anomaly-based approach is problematic in that it is difficult to detect an abnormality in a packet stream unless there is a drastic increase in the amount of data, the number of packets, etc., or a drastic byte string disturbance.

In order to solve these problems, the inventor diligently repeated examinations and experiments. The inventor focused on the fact that a normal packet stream including a command for controlling a device has a constant context, and found that a packet stream deviated from the constant context can be detected as an abnormal packet stream. As a result, the inventor conceived of the following abnormality detection method and device.

An abnormality detection method according to one aspect of the present disclosure includes: calculating, for a detection target packet stream made up of a plurality of detection target packets that are consecutive, a plurality of distances between the plurality of detection target packets; extracting a feature amount of the detection target packet stream using the plurality of distances calculated; and calculating information about a degree of abnormality in the detection target packet stream using the feature amount extracted.

According to this abnormality detection method, a feature of the context of the detection target packet stream can be extracted as a feature amount. Furthermore, information about an abnormality in the detection target packet stream can be calculated using the extracted feature amount. Thus, an abnormality in the packet stream can be detected using the above abnormality detection method.

Furthermore, in the calculating of the plurality of distances, a Levenshtein distance between payloads of the plurality of detection target packets may be used to calculate the plurality of distances.

Furthermore, the Levenshtein distance between the payloads of the plurality of detection target packets may be calculated for each pair of detection target packets that are N packets apart from each other in the detection target packet stream, and the calculation may be applied in units of M bits to at least a portion of bit strings included in the payloads, where N is an integer greater than or equal to 1 and M is an integer between 1 and 16, inclusive, and in the calculating of the plurality of distances, a distance for each pair of detection target packets that are N packets apart from each other in the detection target packet stream may be calculated to calculate the plurality of distances.

Furthermore, the Levenshtein distance between the payloads of the plurality of detection target packets may further be calculated for each pair of detection target packets that are L packets apart from each other in the detection target packet stream, where L is an integer greater than or equal to 1 and different from N, and in the calculating of the plurality of distances, a distance for each pair of detection target packets that are L packets apart from each other in the detection target packet stream may be calculated to calculate the plurality of distances.

Furthermore, in the extracting of the feature amount, for each of one or more windows made up of W consecutive detection target packets in the detection target packet stream, a frequency distribution of the plurality of distances calculated for pairs of detection target packets belonging to the window may be calculated, and the frequency distribution calculated may be extracted as the feature amount, where W is an integer greater than or equal to 2.

Furthermore, in the calculating of the information about the degree of abnormality, an earth mover's distance between the frequency distribution calculated and each of a plurality of reference frequency distributions stored in advance may be calculated, and a k-nearest neighbor method in which the earth mover's distance calculated is used may be used to calculate the information about the degree of abnormality.

Furthermore, in the extracting of the feature amount, for each of one or more windows made up of W consecutive detection target packets in the detection target packet stream, a distance stream made up of the plurality of distances calculated for pairs of detection target packets belonging to the window may be calculated, and the distance stream calculated may be extracted as the feature amount, where W is an integer greater than or equal to 1.

Furthermore, in the calculating of the information about the degree of abnormality, a warping-based distance between the distance stream calculated and each of a plurality of reference distance streams stored in advance may be calculated, and the warping-based distance calculated may be used to calculate the information about the degree of abnormality.

Furthermore, in the calculating of the information about the degree of abnormality, a global alignment kernel stored in advance may be applied to the distance stream calculated, to calculate the information about the degree of abnormality.

Furthermore, in the calculating of the plurality of distances, a plurality of distances between limited pairs of the plurality of detection target packets that are of an identical command type may be calculated.

Furthermore, for each of one or more reference packet streams made up of a plurality of reference packets that are consecutive, each of a plurality of reference distances between the plurality of reference packets may be calculated, a reference feature amount of each of the one or more reference packet streams may be extracted using a corresponding one of the plurality of reference distances calculated, and in the calculating of the information about the degree of abnormality in the detection target packet stream, the reference feature amount extracted may be additionally used to calculate the information about the degree of abnormality in the detection target packet stream.

Furthermore, in the calculating of each of the plurality of reference distances, a Levenshtein distance between payloads of the plurality of reference packets may be used to calculate each of the plurality of reference distances.

Furthermore, the Levenshtein distance between the payloads of the plurality of reference packets may be calculated for each pair of reference packets that are N packets apart from each other in each of the one or more reference packet streams, and the calculation may be applied in units of M bits to at least a portion of bit strings included in the payloads, where N is an integer greater than or equal to 1 and M is an integer between 1 and 16, inclusive, and in the calculating of each of the plurality of reference distances, a reference distance for each pair of reference packets that are N packets apart from each other in each of the one or more reference packet streams may be calculated to calculate each of the plurality of reference distances.

Furthermore, the Levenshtein distance between the payloads of the plurality of reference packets may further be calculated for each pair of detection target packets that are L packets apart from each other in each of the one or more reference packet streams, where L is an integer greater than or equal to 1 and different from N, and in the calculating of each of the plurality of reference distances, a reference distance for each pair of reference packets that are L packets apart from each other in each of the one or more reference packet streams may further be calculated to calculate each of the plurality of reference distances.

Furthermore, for each of one or more reference packet streams made up of a plurality of reference packets that are consecutive, each of a plurality of reference distances between the plurality of reference packets may be calculated, a reference feature amount of a corresponding one of the one or more reference packet streams may be extracted using each of the plurality of reference distances calculated, and in the calculating of each of the plurality of reference distances, a Levenshtein distance between payloads of the plurality of reference packets may be used to calculate each of the plurality of reference distances, the Levenshtein distance between the payloads of the plurality of reference packets may be calculated for each pair of reference packets that are N packets apart from each other in each of the one or more reference packet streams, and the calculation may be applied in units of M bits to at least a portion of bit strings included in the payloads, where N is an integer greater than or equal to 1 and M is an integer between 1 and 16, inclusive, and in the extracting of the reference feature amount of each of the one or more reference packet streams, for each of one or more windows made up of W consecutive reference packets in each of the one or more reference packet streams, a frequency distribution of the plurality of reference distances calculated for pairs of reference packets belonging to the window may be calculated, the frequency distribution of the plurality of reference distances calculated may be extracted as the reference feature amount of the reference packet stream, and the reference feature amount of the reference packet stream that has been extracted may be stored as a corresponding one of the plurality of reference frequency distributions stored in advance, where W is an integer greater than or equal to 2.

Furthermore, for each of one or more reference packet streams made up of a plurality of reference packets that are consecutive, each of a plurality of reference distances between the plurality of reference packets may be calculated, a reference feature amount of each of the one or more reference packet streams may be extracted using a corresponding one of the plurality of reference distances calculated, and in the calculating of each of the plurality of reference distances, a Levenshtein distance between payloads of the plurality of reference packets may be used to calculate each of the plurality of reference distances, the Levenshtein distance between the payloads of the plurality of reference packets may be calculated for each pair of reference packets that are N packets apart from each other in each of the one or more reference packet streams, and the calculation may be applied in units of M bits to at least a portion of bit strings included in the payloads, where N is an integer greater than or equal to 1 and M is an integer between 1 and 16, inclusive, and in the extracting of the reference feature amount of each of the one or more reference packet streams, for each of one or more windows made up of W consecutive reference packets in each of the one or more reference packet streams, a reference distance stream made up of the plurality of reference distances calculated for pairs of reference packets belonging to the window may be calculated, and the reference distance stream calculated may be extracted as the reference feature amount of the reference packet stream, where W is an integer greater than or equal to 2, and the reference feature amount of the reference packet stream that has been extracted may be stored as one of the plurality of reference distance streams stored in advance.

Furthermore, for each of one or more reference packet streams made up of a plurality of reference packets that are consecutive, each of a plurality of reference distances between the plurality of reference packets may be calculated, a reference feature amount of each of the one or more reference packet streams may be extracted using a corresponding one of the plurality of reference distances calculated, and in the calculating of each of the plurality of reference distances, a Levenshtein distance between payloads of the plurality of reference packets may be used to calculate each of the plurality of reference distances, the Levenshtein distance between the payloads of the plurality of reference packets may be calculated for each pair of reference packets that are N packets apart from each other in each of the one or more reference packet streams, and the calculation may be applied in units of M bits to at least a portion of bit strings included in the payloads, where N is an integer greater than or equal to 1 and M is an integer between 1 and 16, inclusive, and in the extracting of the reference feature amount of each of the one or more reference packet streams, for each of one or more windows made up of W consecutive reference packets in each of the one or more reference packet streams, a reference distance stream made up of the plurality of reference distances calculated for pairs of reference packets belonging to the window may be calculated, and the reference distance stream calculated may be extracted as the reference feature amount of the reference packet stream, where W is an integer greater than or equal to 2, and a global alignment kernel may be calculated using the reference feature amount of the reference packet stream that has been extracted, and the global alignment kernel calculated may be stored as the global alignment kernel stored in advance.

Furthermore, in the calculating of each of the plurality of reference distances, reference distances between limited pairs of the plurality of reference packets that are of an identical command type may be calculated.

Furthermore, an abnormality detection device according to one aspect of the present disclosure includes: a detection target packet data distance calculator that calculates, for a detection target packet stream made up of a plurality of detection target packets that are consecutive, a plurality of distances between the plurality of detection target packets; a feature amount extractor that extracts a feature amount of the detection target packet stream using the plurality of distances calculated; and an information calculator that calculates information about a degree of abnormality in the detection target packet stream using the feature amount extracted.

With this abnormality detection device, a feature of the context of the detection target packet stream can be extracted as a feature amount. Furthermore, information about an abnormality in the detection target packet stream can be calculated using the extracted feature amount. Thus, an abnormality in the packet stream can be detected using the above abnormality detection device.

Furthermore, a reference packet data distance calculator that calculates, for each of one or more reference packet streams made up of a plurality of reference packets that are consecutive, each of a plurality of reference distances between the plurality of reference packets, and a reference feature amount extractor that extracts a reference feature amount of each of the one or more reference packet streams using a corresponding one of the plurality of reference distances calculated may be included, and the information calculator may additionally use the reference feature amount extracted, to calculate the information about the degree of abnormality in the detection target packet stream.

Hereinafter, specific examples of the abnormality detection method and device according to one aspect of the present disclosure will be described with reference to the drawings. Each of the embodiments described below shows a specific example of the present disclosure. Thus, the numerical values, shapes, structural elements, and the arrangement and connection of the structural elements, steps, the processing order of the steps etc., shown in the following embodiments are mere examples, and are not intended to limit the present disclosure. Among the structural elements in the following embodiments, structural elements not recited in any one of the independent claims are structural elements that can be arbitrarily included. Note that the figures are schematic diagrams and are not necessarily precise illustrations.

Embodiment 1

Hereinafter, an abnormality detection device according to Embodiment 1 will be described. This abnormality detection device detects an abnormality in a detection target packet stream.

[1-1. Configuration]

FIG. 1 is a block diagram illustrating the configuration of abnormality detection device 1 according to Embodiment 1.

As illustrated in FIG. 1, abnormality detection device 1 includes first profile determiner 11, first extractor 12, reference packet data stream group storage 13, reference packet data distance calculator 14, reference feature amount extractor 15, reference feature amount storage 16, second profile determiner 21, second extractor 22, detection target packet data stream storage 23, detection target packet data distance calculator 24, feature amount extractor 25, feature amount storage 26, information calculator 27, and determiner 28.

Abnormality detection device 1 is provided, for example, as a computer device including memory and a processor that executes a program stored in the memory. In this case, various functions of abnormality detection device 1 are implemented by the processor included in abnormality detection device 1 executing the program stored in the memory included in abnormality detection device 1.

First profile determiner 11 obtains reference packet stream group 10 which is a group of normal packet streams, in other words, a group of packet streams including no abnormal packet streams. Subsequently, for each packet included in each reference packet stream in obtained reference packet stream group 10, a corresponding profile is determined on the basis of attribute information (such as a source IP, a destination IP, a source port, a destination port, and a protocol; a combination thereof is also included) of the packet. First profile determiner 11 may store profile information and determine the corresponding profile on the basis of the stored profile information, for example.

FIG. 2 is a schematic diagram illustrating one example of the profile information stored in first profile determiner 11.

First profile determiner 11 stores the profile information illustrated in FIG. 2 and determines, for each packet, a profile identified by profile ID in a row with the same target command, for example.

Figure 3:
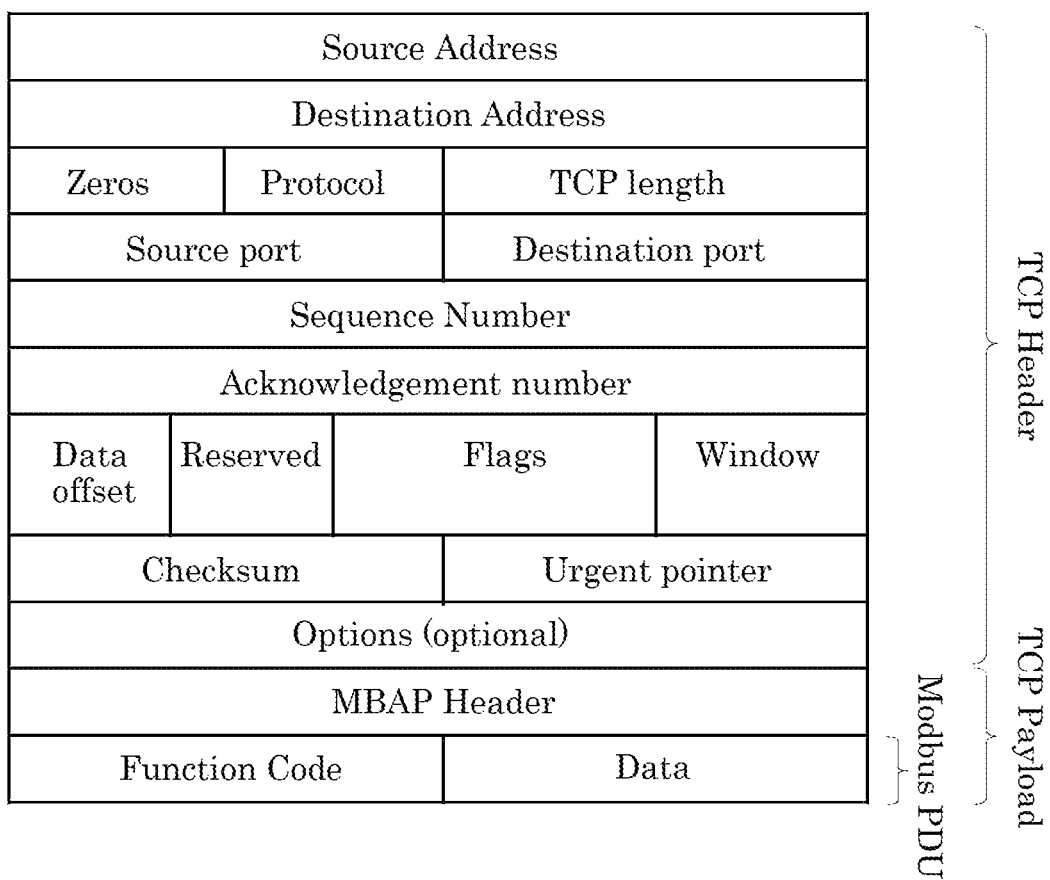
FIG. 3 is a schematic diagram illustrating the data structure of a Modbus/TCP protocol packet.

FIG. 3 is a schematic diagram illustrating the data structure of a Modbus/TCP protocol packet.

For example, in the case where a packet is a Modbus/TCP protocol packet, first profile determiner 11 determines, as a packet with the same target command, a packet in which a bit string stored in the Data field illustrated in FIG. 3 matches a bit string corresponding to the target command.

Figure 4:
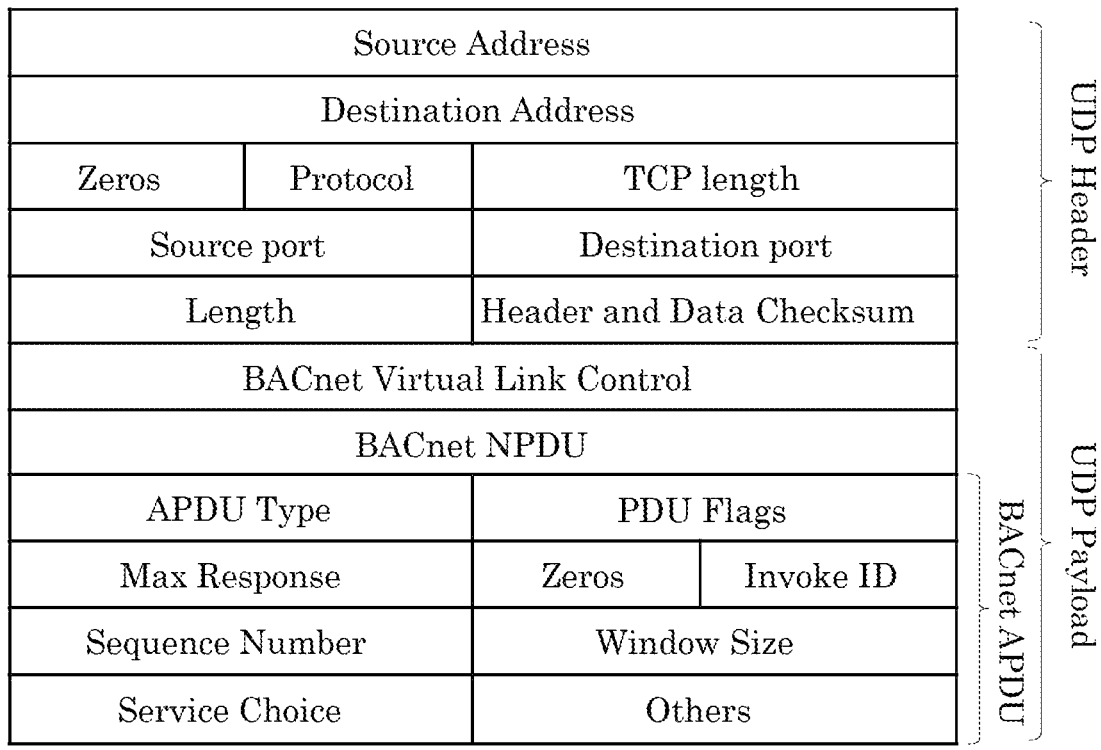
FIG. 4 is a schematic diagram illustrating the data structure of a BACnet/IP protocol packet.

FIG. 4 is a schematic diagram illustrating the data structure of a BACnet/IP protocol packet.

For example, in the case where a packet is a BACnet/IP protocol packet, first profile determiner 11 determines, as a packet with the same target command, a packet in which a bit string stored in the APDU Type field illustrated in FIG. 4 and a bit string stored in the Service Choice field illustrated in FIG. 4 match a bit string corresponding to the target command.

For example, in the case where a packet for which a profile is to be determined does not match the stored profile information, first profile determiner 11 may execute an application including a deep packet inspection function, thereby specify a protocol for the packet, and determine a profile for the packet on the basis of the specified protocol.

Returning to FIG. 1, the description of abnormality detection device 1 will continue.

For each packet the profile of which has been determined by first profile determiner 11, first extractor 12 extracts, as packet data, a bit string stored in the payload field of the packet.

For example, in the case where a packet to be extracted is a Modbus/TCP protocol packet, first extractor 12 extracts, as the packet data, a bit string stored in the TCP Payload field illustrated in FIG. 3.

For example, in the case where a packet to be extracted is a BACnet/IP protocol packet, first extractor 12 extracts, as the packet data, a bit string stored in the UDP Payload field illustrated in FIG. 4.

When first extractor 12 extracts the packet data from each packet, first extractor 12 outputs a reference packet data stream made up of packet data with the same profile for each reference packet stream obtained by first profile determiner 11.

Figure 5:
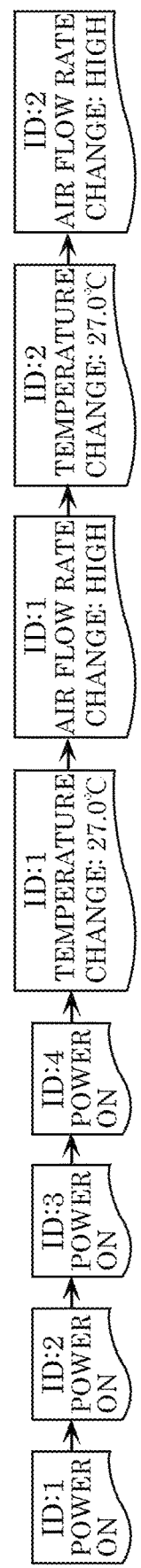
FIG. 5 is a schematic diagram illustrating one example of a reference packet data stream.

FIG. 5 is a schematic diagram illustrating one example of the reference packet data stream output by first extractor 12.

For example, first extractor 12 outputs a reference packet data stream including, in a sequence: packet data corresponding to a write command for "powering ON the device identified by ID=1"; packet data corresponding to a write command for "powering ON the device identified by ID=2"; packet data corresponding to a write command for "powering ON the device identified by ID=3"; packet data corresponding to a write command for "powering ON the device identified by ID=4"; packet data corresponding to a write command for "changing the temperature settings of the device identified by ID=1 to 27.0° C."; packet data corresponding to a write command for "changing the air flow rate settings of the device identified by ID=1 to HIGH"; packet data corresponding to a write command for "changing the temperature settings of the device identified by ID=2 to 27.0° C."; and packet data corresponding to a write command for "changing the air flow rate settings of the device identified by ID=2 to HIGH", which are illustrated in FIG. 5.

Returning to FIG. 1, the description of abnormality detection device 1 will continue.

Reference packet data stream group storage 13 stores a reference packet data stream group made up of one or more reference packet data streams output from first extractor 12.

Reference packet data distance calculator 14 calculates, for each reference packet data stream stored in reference packet data stream group storage 13, a plurality of reference distances between a plurality of reference packet data included in the reference packet data stream.

Reference packet data distance calculator 14 handles the packet data as byte strings cut out on a byte-by-byte basis and calculates a reference distance between the reference packet data by calculating a byte string distance between the reference packet data.

Figure 6:
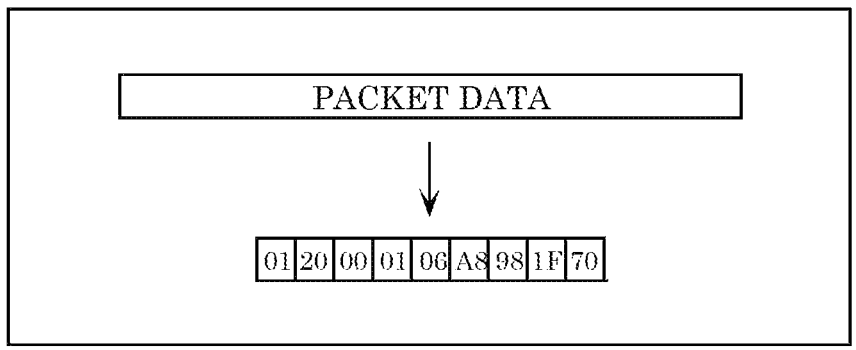
FIG. 6 is a schematic diagram illustrating one example where a reference packet data distance calculator according to Embodiment 1 cuts out packet data on a byte-by-byte basis.

FIG. 6 is a schematic diagram illustrating one example where reference packet data distance calculator 14 cuts out the packet data on a byte-by-byte basis.

Note that reference packet data distance calculator 14 is described herein as cutting out the packet data on a byte-by-byte basis, but the unit to be cut out does not necessarily need to be limited to the example of the byte-by-byte basis. The unit to be cut out may be a bit string having an arbitrary length between 1 bit and 16 bits, inclusive, or may be a bit string having another arbitrary length, for example. In addition, reference packet data distance calculator 14 does not need to be limited to an example of cutting out the packet data in units of consecutive bits. For example, reference packet data distance calculator 14 may cut out a bit string by repeating the process of cutting out x bits and skipping y bits.

Returning to FIG. 1, the description of abnormality detection device 1 will continue.

Reference packet data distance calculator 14 calculates a reference distance using the Levenshtein distance between the packet data.

The Levenshtein distance is a distance that can be set between two character strings or byte strings. The Levenshtein distance is defined as the minimum number of times required to modify one character string or byte string into the other character string or byte string by way of insertions, deletions, and substitutions.

Figure 7:
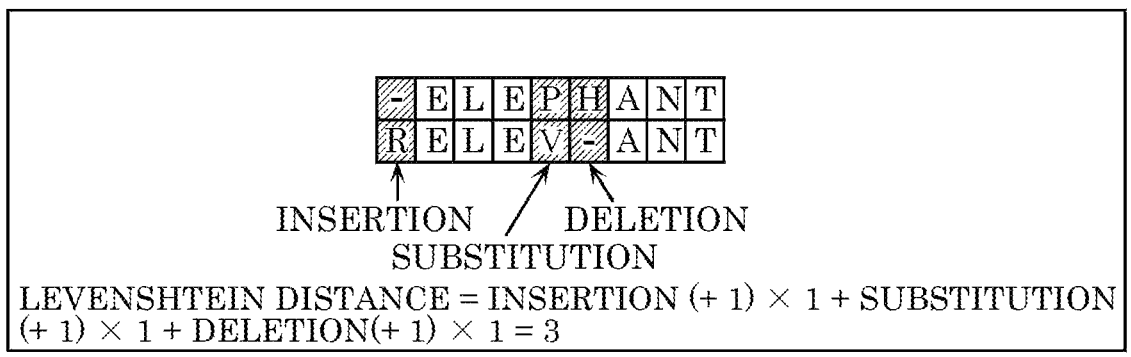
FIG. 7 is a schematic diagram illustrating one example where a reference packet data distance calculator according to Embodiment 1 calculates the Levenshtein distance between two character strings.

FIG. 7 is a schematic diagram illustrating one example where reference packet data distance calculator 14 calculates the Levenshtein distance between two character strings (here, as an example, between the character strings "ELEPHANT" and "RELEVANT").

As illustrated in FIG. 7, the minimum number of times of insertions, deletions, and substitutions required to modify "ELEPHANT" into "RELEVANT" is three. Therefore, reference packet data distance calculator 14 calculates the Levenshtein distance between "ELEPHANT" and "RELEVANT" as "3".

Figure 8:
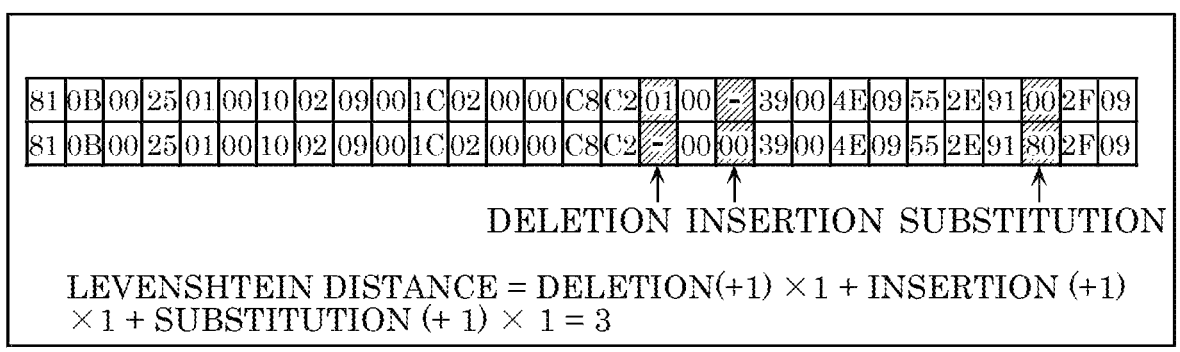
FIG. 8 is a schematic diagram illustrating one example where a reference packet data distance calculator according to Embodiment 1 calculates the Levenshtein distance between two byte strings.

FIG. 8 is a schematic diagram illustrating one example where reference packet data distance calculator 14 calculates the Levenshtein distance between two byte strings.

As illustrated in FIG. 8, the minimum number of times of insertions, deletions, and substitutions required to modify one byte string into the other byte string is three. Therefore, reference packet data distance calculator 14 calculates, as "3", the Levenshtein distance between the byte strings illustrated in FIG. 8.

Reference packet data distance calculator 14 calculates, for each pair of reference packets that are N packets apart from each other (N is an integer greater than or equal to 1), a plurality of reference distances between a plurality of reference packet data included in the reference packet data stream.

Figure 9:
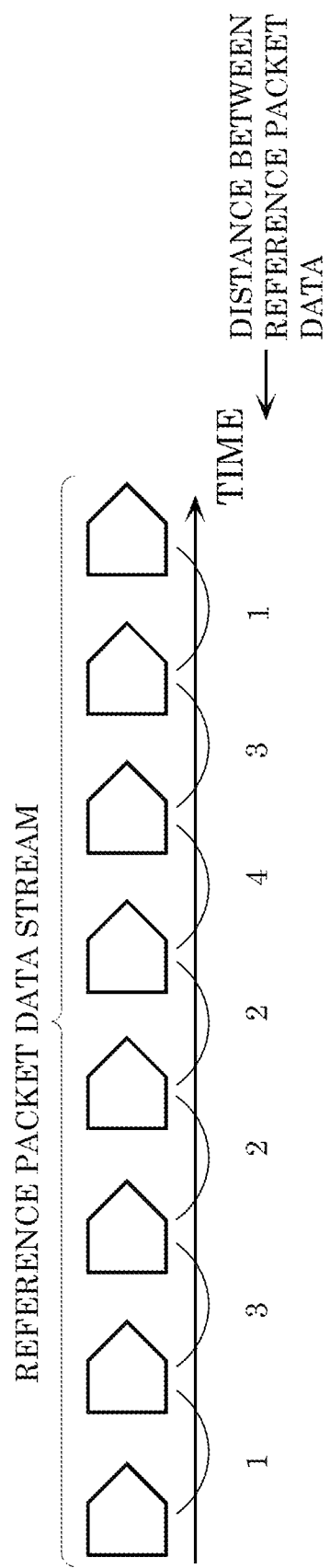
FIG. 9 is a schematic diagram illustrating one example where a reference packet data distance calculator according to Embodiment 1 calculates a reference distance.

FIG. 9 is a schematic diagram illustrating one example where reference packet data distance calculator 14 calculates the plurality of reference distances from the reference packet data stream when N is 1. Although N is described as being 1 herein, N is not necessarily limited to 1.

As illustrated in FIG. 9, in the case where a current reference packet data stream is made up of eight consecutive reference packet data, reference packet data distance calculator 14 calculates seven reference distances between reference packet data that are one data apart from each other, in other words, between reference packet data adjacent to each other, from the current reference packet data stream.

It is sufficient that reference packet data distance calculator 14 calculate, as the Levenshtein distance between the packet data, the Levenshtein distance for each pair of at least some of bit strings included in the packet data; reference packet data distance calculator 14 does not necessarily need to calculate the Levenshtein distance for every pair of the bit strings included in the packet data.

Returning to FIG. 1, the description of abnormality detection device 1 will continue.

For each reference packet data stream stored in reference packet data stream group storage 13, reference feature amount extractor 15 extracts a reference feature amount using a corresponding one of the plurality of reference distances calculated by reference packet data distance calculator 14. More specifically, for each reference packet data stream stored in reference packet data stream group storage 13, reference feature amount extractor 15 calculates a frequency distribution of a plurality of reference distances calculated for a reference packet data belonging to each of one or more windows made up of W consecutive reference packet data (W is an integer greater than or equal to 2), and extracts each calculated reference distance frequency distribution as a reference feature amount.

Figure 10:
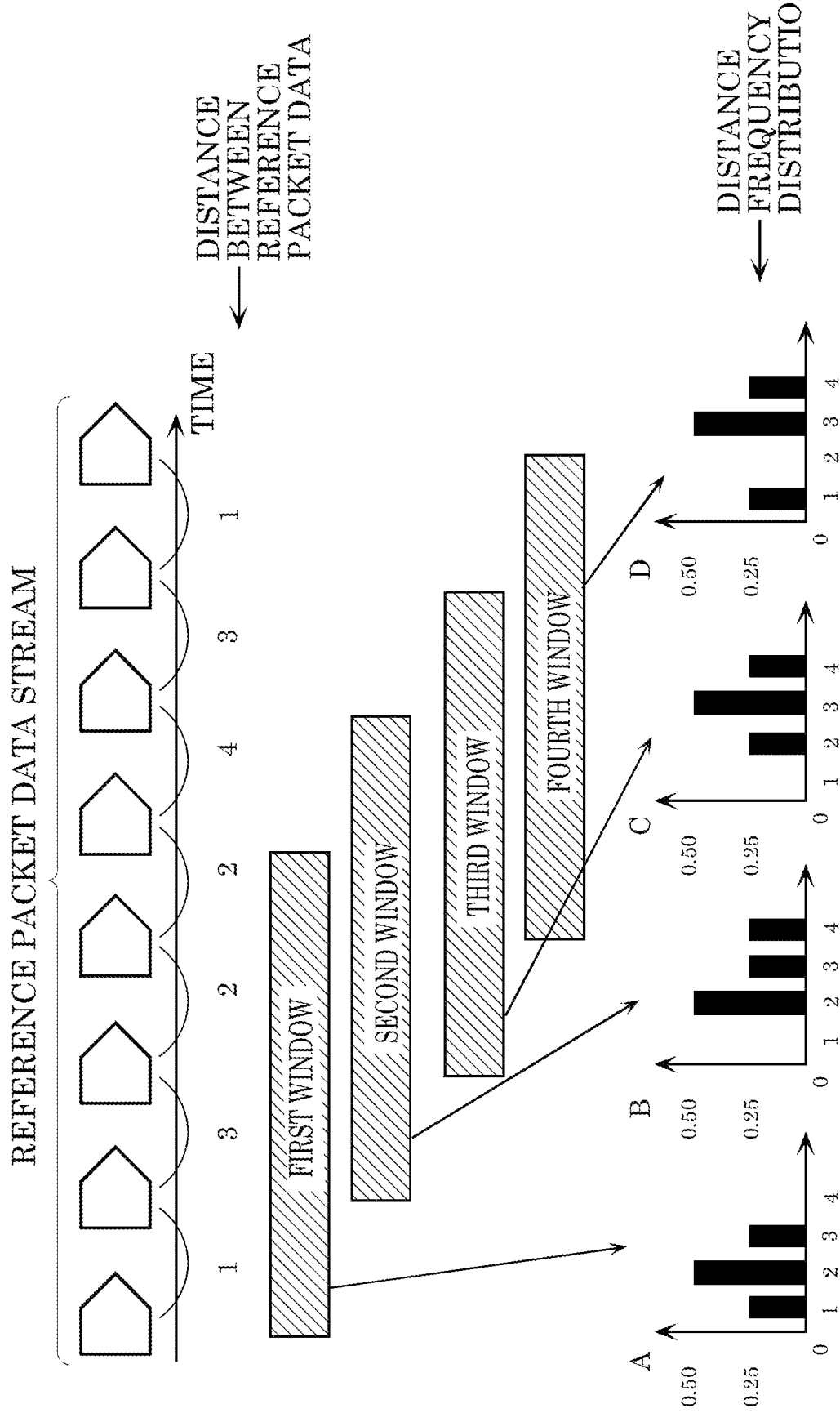
FIG. 10 is a schematic diagram illustrating one example where a reference feature amount extractor according to Embodiment 1 extracts a reference feature amount.

FIG. 10 is a schematic diagram illustrating one example where reference feature amount extractor 15 extracts a reference feature amount from one reference packet data stream. The schematic diagram in FIG. 10 illustrates the case where reference packet data distance calculator 14 calculates the plurality of reference distances illustrated in FIG. 9 for one reference packet data stream when W is 4.

As illustrated in FIG. 10, the reference distances calculated for the reference packet data belonging to the first window are "1", "3", "2", and "2". Therefore, reference feature amount extractor 15 calculates, as the frequency distribution of the plurality of reference distances in the first window, frequency distribution A (refer to "A" in FIG. 10) in which the frequency of "1" is "0.25", the frequency of "2" is "0.5", the frequency of "3" is "0.25", and the frequency of "4" is "0". The reference distances calculated for the reference packet data belonging to the second window are "3", "2", "2", and "4". Therefore, reference feature amount extractor 15 calculates, as the frequency distribution of the plurality of reference distances in the second window, frequency distribution B (refer to "B" in FIG. 10) in which the frequency of "1" is "0", the frequency of "2" is "0.5", the frequency of "3" is "0.25", and the frequency of "4" is "0.25". The reference distances calculated for the reference packet data belonging to the third window are "2", "2", "4", and "3". Therefore, reference feature amount extractor 15 calculates, as the frequency distribution of the plurality of reference distances in the third window, frequency distribution C (refer to "C" in FIG. 10) in which the frequency of "1" is "0", the frequency of "2" is "0.25", the frequency of "3" is "0.5", and the frequency of "4" is "0.25". The reference distances calculated for the reference packet data belonging to the fourth window are "2", "4", "3", and "1". Therefore, reference feature amount extractor 15 calculates, as the frequency distribution of the plurality of reference distances in the fourth window, frequency distribution D (refer to "D" in FIG. 10) in which the frequency of "1" is "0.25", the frequency of "2" is "0", the frequency of "3" is "0.5", and the frequency of "4" is "0.25". Subsequently, reference feature amount extractor 15 extracts, as reference feature amounts, frequency distribution A, frequency distribution B, frequency distribution C, and frequency distribution D that have been calculated.

Returning to FIG. 1, the description of abnormality detection device 1 will continue.

Reference feature amount storage 16 stores the reference feature amounts extracted by reference feature amount extractor 15.

Second profile determiner 21 obtains detection target packet stream 20 which is subject to abnormality detection. Subsequently, for each packet included in obtained detection target packet stream 20, a corresponding profile is determined on the basis of attribute information (such as a source IP, a destination IP, a source port, a destination port, and a protocol; a combination thereof is also included) of the packet. Second profile determiner 21 determines a profile using an algorithm that is substantially the same as that used in the profile determination performed by first profile determiner 11.

For each of a plurality of packets the profiles of which have been determined by second profile determiner 21, second extractor 22 extracts, as packet data, a bit string stored in the payload field of the packet. Second extractor 22 extracts the packet data using an algorithm that is substantially the same as that used in the packet data extraction performed by first extractor 12.

When second extractor 22 extracts the packet data, second extractor 22 outputs a detection target packet data stream made up of packet data having the same profile.

Detection target packet data stream storage 23 stores the detection target packet data stream output from second extractor 22.

For the detection target packet data stream stored in detection target packet data stream storage 23, detection target packet data distance calculator 24 calculates a plurality of distances between a plurality of detection target packet data included in the detection target packet data stream.

Detection target packet data distance calculator 24 calculates a distance using an algorithm that is substantially the same as an algorithm resulting from replacing the reference packet by a detection target packet, replacing the reference packet data by detection target packet data, replacing the reference packet data stream by a detection target packet data stream, and replacing the reference distance by a distance, as compared to the reference distance calculation performed by reference packet data distance calculator 14.

Figure 11:
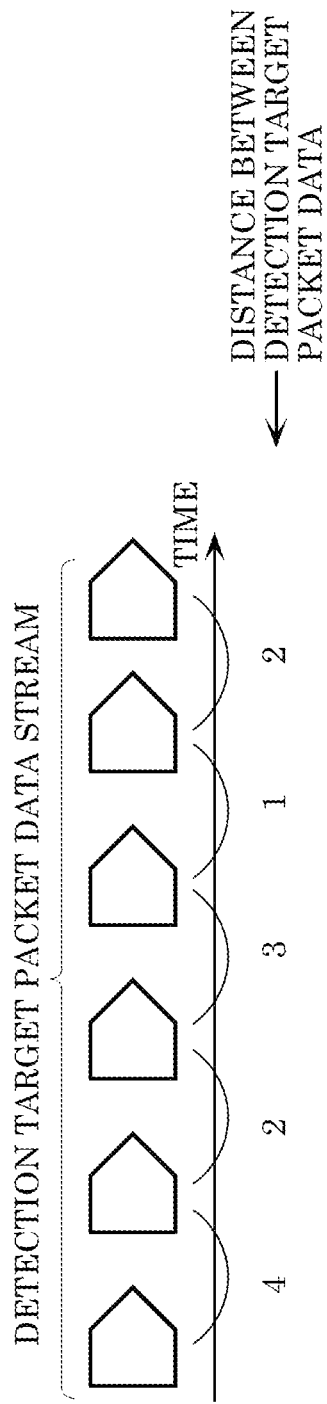
FIG. 11 is a schematic diagram illustrating one example where a detection target packet data distance calculator according to Embodiment 1 calculates a distance.

FIG. 11 is a schematic diagram illustrating one example where detection target packet data distance calculator 24 calculates a plurality of distances from the detection target packet data stream when N is 1. Although N is described as being 1 herein, N is not necessarily limited to 1.

As illustrated in FIG. 11, in the case where a current detection target packet data stream is made up of six consecutive detection target packet data, detection target packet data distance calculator 24 calculates five distances between detection target packet data that are one data apart from each other, in other words, between detection target packet data adjacent to each other, from the current detection target packet data stream.

It is sufficient that detection target packet data distance calculator 24 calculate, as the Levenshtein distance between the packet data, the Levenshtein distance for each pair of at least some of bit strings included in the packet data; detection target packet data distance calculator 24 does not necessarily need to calculate the Levenshtein distance for every pair of the bit strings included in the packet data.

Returning to FIG. 1, the description of abnormality detection device 1 will continue.

For the detection target packet data stream stored in detection target packet data stream storage 23, feature amount extractor 25 extracts a feature amount using the plurality of distances calculated by detection target packet data distance calculator 24. More specifically, for the detection target packet data stream stored in detection target packet data stream storage 23, feature amount extractor 25 calculates a frequency distribution of a plurality of distances calculated for detection target packets belonging to each of one or more windows made up of W consecutive detection target packet data (W is an integer greater than or equal to 2), and extracts the calculated distance frequency distribution as a feature amount.

Figure 12:
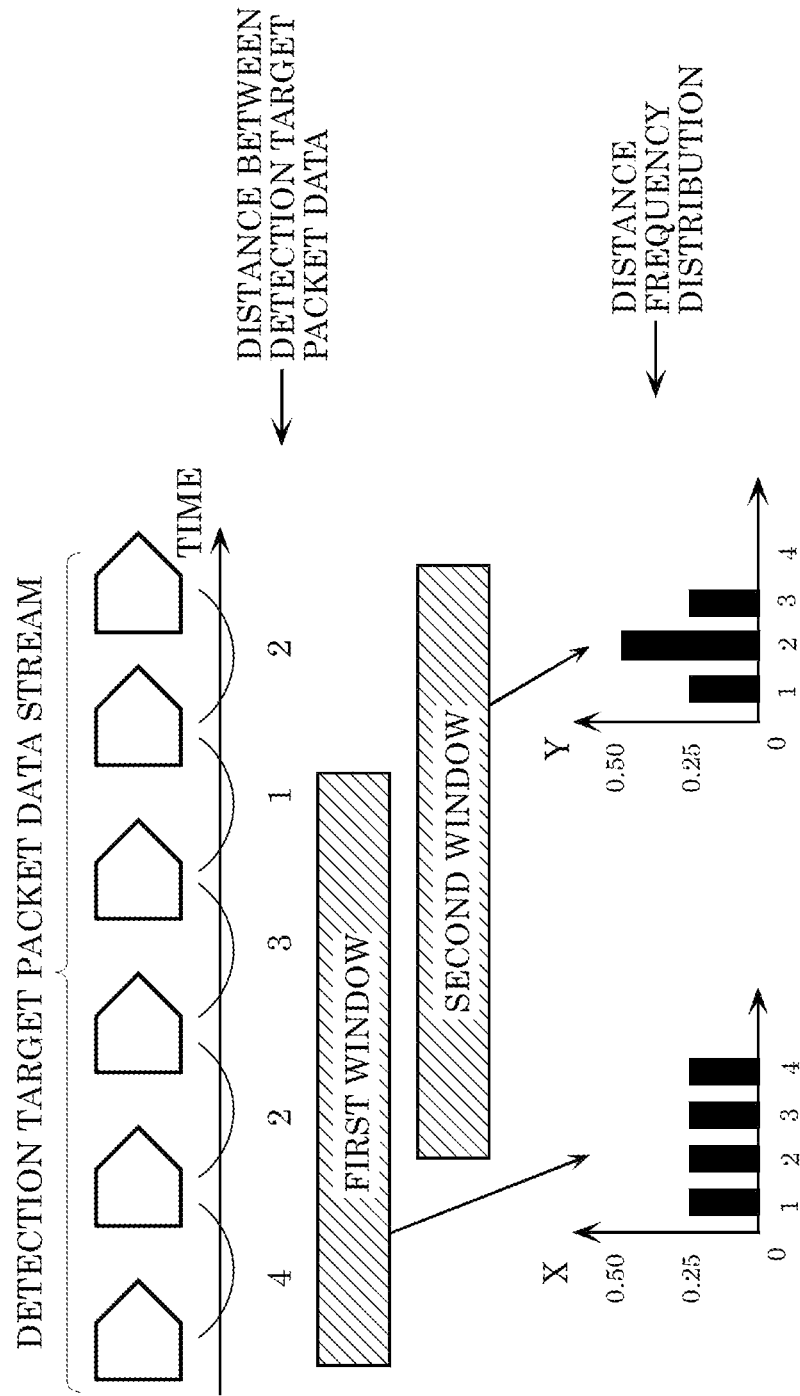
FIG. 12 is a schematic diagram illustrating one example where a feature amount extractor according to Embodiment 1 extracts a feature amount from a detection target packet data stream.

FIG. 12 is a schematic diagram illustrating one example where feature amount extractor 25 extracts a feature amount from the detection target packet data stream. The schematic diagram in FIG. 12 illustrates the case where detection target packet data distance calculator 24 calculates the plurality of distances illustrated in FIG. 11 for the detection target packet data stream when W is 4.

As illustrated in FIG. 12, the distances calculated for the detection target packet data belonging to the first window are "4", "2", "3", and "1". Therefore, feature amount extractor 25 calculates, as the frequency distribution of the plurality of distances in the first window, frequency distribution X (refer to "X" in FIG. 12) in which the frequency of "1" is "0.25", the frequency of "2" is "0.25", the frequency of "3" is "0.25", and the frequency of "4" is "0.25". The distances calculated for the detection target packet data belonging to the second window are "2", "3", "1", and "2". Therefore, feature amount extractor 25 calculates, as the frequency distribution of the plurality of distances in the second window, frequency distribution Y (refer to "Y" in FIG. 12) in which the frequency of "1" is "0", the frequency of "2" is "0.5", the frequency of "3" is "0.25", and the frequency of "4" is "0". Subsequently, feature amount extractor 25 extracts, as feature amounts, frequency distribution X and frequency distribution Y that have been calculated.

Returning to FIG. 1, the description of abnormality detection device 1 will continue.

Feature amount storage 26 stores the feature amounts extracted by feature amount extractor 25.

Information calculator 27 calculates the earth mover's distance (hereinafter also referred to as EMD) between each of the reference distance frequency distributions stored in reference feature amount storage 16 as the reference feature amount and each of the distance frequency distributions stored in feature amount storage 26 as the feature amount, and calculates an abnormality degree, which indicates the degree of abnormality in detection target packet stream 20, using a k-nearest neighbor method in which the calculated earth mover's distance is used.

The earth mover's distance is a distance that can be set between two probability distributions (here, between the reference distance frequency distribution and the distance frequency distribution). The earth mover's distance is defined as the minimum cost required to modify one probability distribution (here, one frequency distribution) into the other probability distribution (here, the other frequency distribution) by the movement of probability components (here, frequency components).

Figure 13:
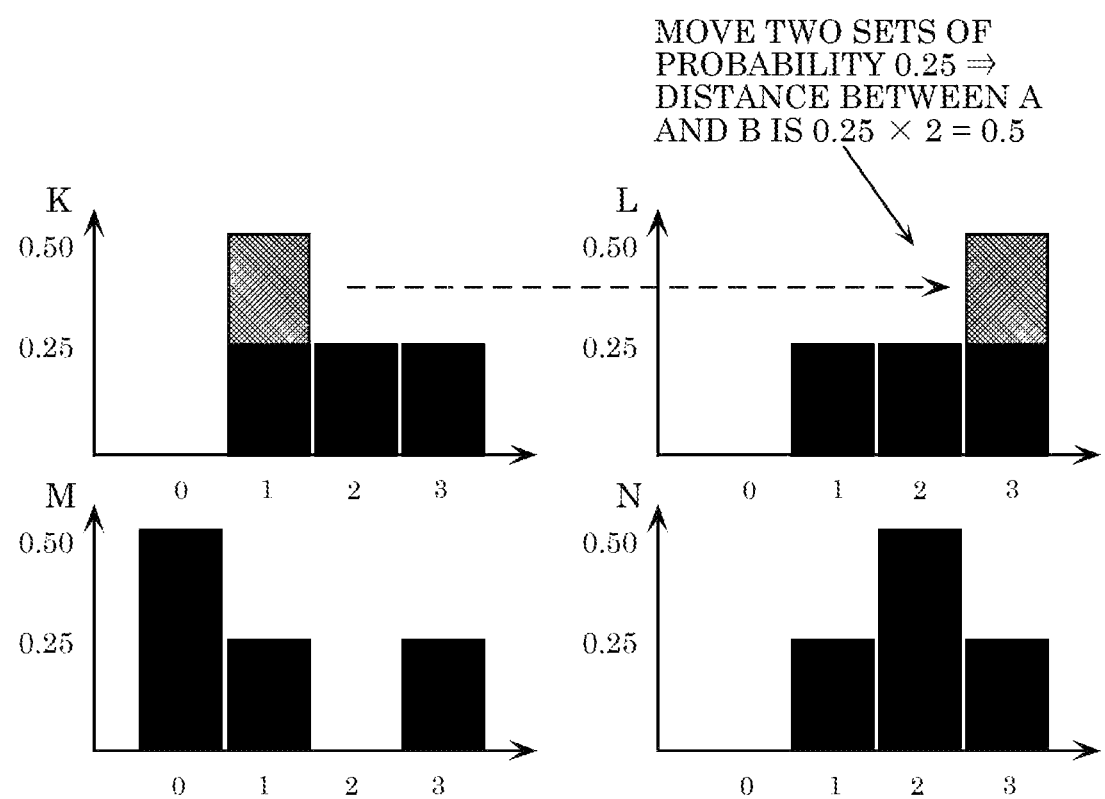
FIG. 13 is a schematic diagram illustrating one example where an information calculator according to Embodiment 1 calculates the earth mover's distance.

FIG. 13 is a schematic diagram illustrating one example where information calculator 27 calculates the earth mover's distance between four frequency distributions (frequency distribution K, frequency distribution L, frequency distribution M, and frequency distribution N).

As illustrated in FIG. 13, the minimum cost required to convert frequency distribution K (refer to "K" in FIG. 13) in which the frequency of "0" is "0", the frequency of "1" is "0.5", the frequency of "2" is "0.25", and the frequency of "3" is "0.25" into frequency distribution L (refer to "L" in FIG. 13) in which the frequency of "0" is "0", the frequency of "1" is "0.25", the frequency of "2" is "0.25", and the frequency of "3" is "0.5" is a cost for moving the frequency component "0.25" included in the frequency of "1", which is "0.5", in frequency distribution K to the frequency of "3" in frequency distribution L. Therefore, information calculator 27 calculates 0.25×1-31=0.5 as the earth mover's distance between frequency distribution K and frequency distribution L. Similarly, information calculator 27 calculates, as the earth mover's distances between the four frequency distributions, the respective values indicated in the table in FIG. 13.

Figure 14:
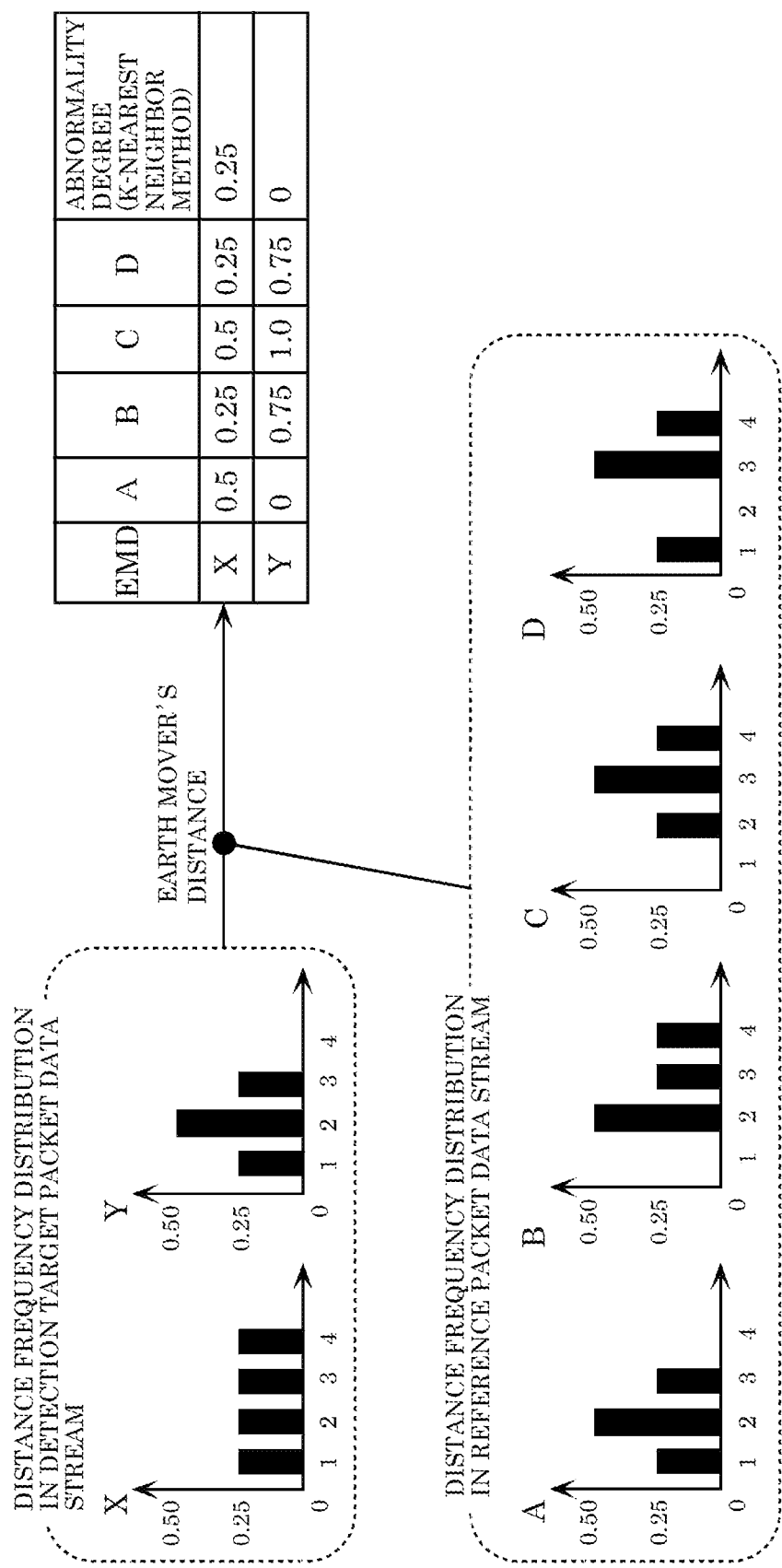
FIG. 14 is a schematic diagram illustrating one example where an information calculator according to Embodiment 1 calculates an abnormality degree of a detection target packet stream.

FIG. 14 is a schematic diagram illustrating one example where information calculator 27 calculates the abnormality degree of detection target packet stream 20 from each of the reference distance frequency distributions stored in reference feature amount storage 16 as the reference feature amount and each of the distance frequency distributions stored in feature amount storage 26 as the feature amount. The schematic diagram in FIG. 14 illustrates the case where the reference distance frequency distributions stored in reference feature amount storage 16 are frequency distribution A, frequency distribution B, frequency distribution C, and frequency distribution D illustrated in FIG. 10, and the distance frequency distributions stored in feature amount storage 26 are frequency distribution X and frequency distribution Y illustrated in FIG. 12.

As illustrated in FIG. 14, information calculator 27 calculates "0.5" as the earth mover's distance between frequency distribution X and frequency distribution A (hereinafter also referred to as "EMD_XA"), calculates "0.25" as the earth mover's distance between frequency distribution X and frequency distribution B (hereinafter also referred to as "EMD_XB"), calculates "0.5" as the earth mover's distance between frequency distribution X and frequency distribution C (hereinafter also referred to as "EMD_XC"), and calculates "0.25" as the earth mover's distance between frequency distribution X and frequency distribution D (hereinafter also referred to as "EMD_XD"). Subsequently, information calculator 27 applies, to EMD_XA, EMD_XB, EMD_XC, and EMD_XD, a k-nearest neighbor method where K=1, and calculates "0.25" as the abnormality degree of frequency distribution X. Similarly, information calculator 27 calculates "0" as the earth mover's distance between frequency distribution Y and frequency distribution A (hereinafter also referred to as "EMD_YA"), calculates "0.75" as the earth mover's distance between frequency distribution Y and frequency distribution B (hereinafter also referred to as "EMD_YB"), calculates "1.0" as the earth mover's distance between frequency distribution Y and frequency distribution C (hereinafter also referred to as "EMD_YC"), and calculates "0.75" as the earth mover's distance between frequency distribution Y and frequency distribution D (hereinafter also referred to as "EMD_YD"). Subsequently, information calculator 27 applies, to EMD_YA, EMD_YB, EMD_YC, and EMD_YD, a k-nearest neighbor method where K=1, and calculates "0" as the abnormality degree of frequency distribution Y. Furthermore, information calculator 27 calculates, as the abnormality degree of detection target packet stream 20, the abnormality value "0.25" of frequency distribution X or the abnormality value "0" of frequency distribution Y, whichever is largest, i.e., "0.25".

Returning to FIG. 1, the description of abnormality detection device 1 will continue.

On the basis of the abnormality degree of detection target packet stream 20 that has been calculated by information calculator 27, determiner 28 determines whether or not detection target packet stream 20 is abnormal. Subsequently, determiner 28 outputs the determination result to the outside of determiner 28. For example, determiner 28 may store a threshold value, and when the abnormality degree of detection target packet stream 20 is greater than or equal to the threshold value, determiner 28 may determine that detection target packet stream 20 is abnormal, and when the abnormality degree of detection target packet stream 20 is less than the threshold value, determiner 28 may determine that detection target packet stream 20 is not abnormal. Furthermore, determiner 28 may store, for each profile that is subject to the determination of first profile determiner 11 and second file profile determiner 21, a threshold value that is a mutually independent value, and may perform the above determination using the threshold value corresponding to the profile of a detection target packet extracted from detection target packet stream 20.

[1-2. Operations]

Abnormality detection device 1 having the above configuration performs the first reference feature amount extraction process and the first abnormality detection process. These processes will be described below with reference to the drawings.

First, the first reference feature amount extraction process will be described.

The first reference feature amount extraction process is a process of extracting a reference feature amount from reference packet stream group 10. For example, when a user of abnormality detection device 1 operates abnormality detection device 1 to start the first reference feature amount extraction process, the first reference feature amount extraction process starts.

Figure 15:
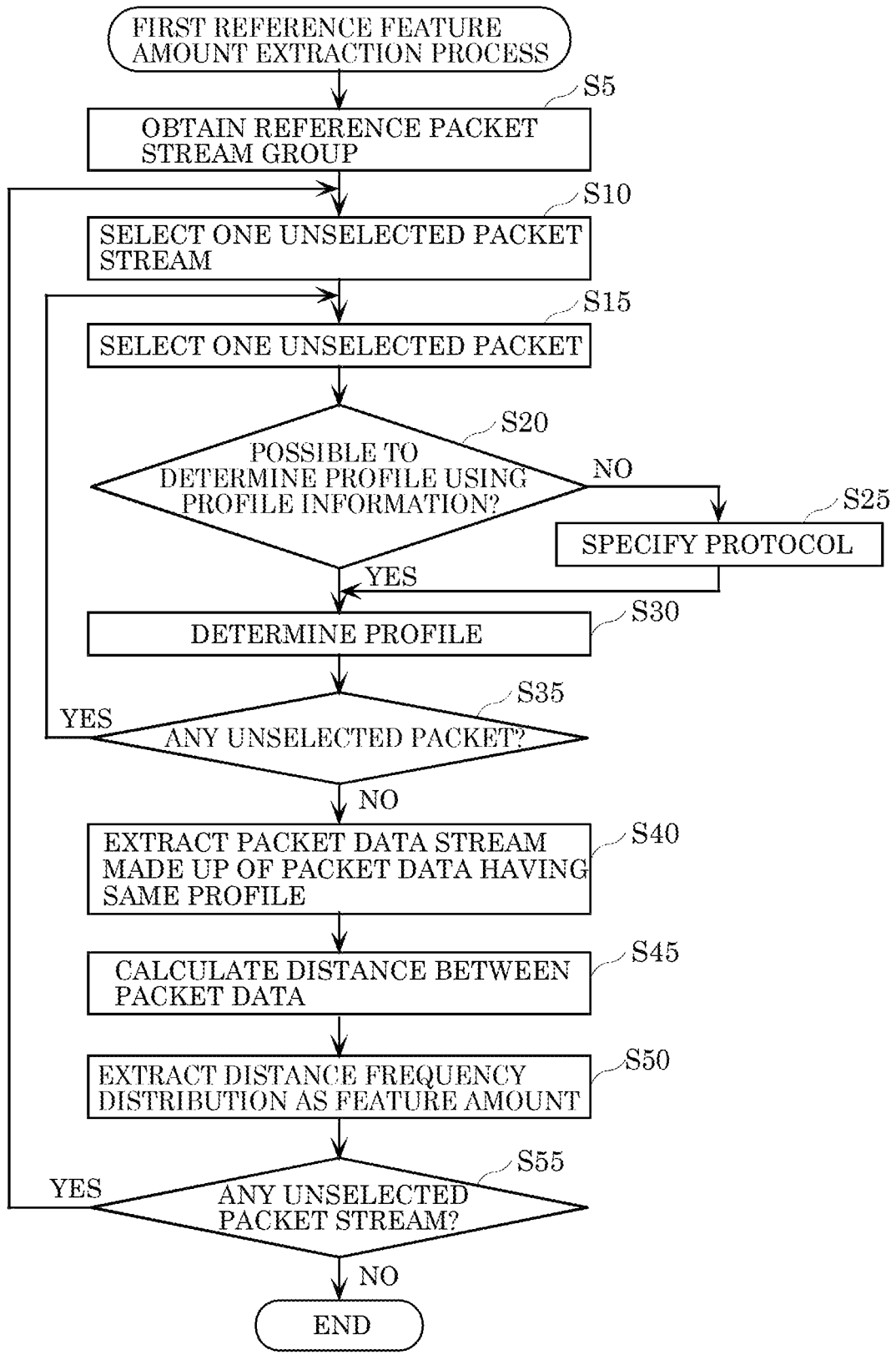
FIG. 15 is a flowchart of a first reference feature amount extraction process.

FIG. 15 is a flowchart of the first reference feature amount extraction process.

When the first reference feature amount extraction process starts, first profile determiner 11 obtains reference packet stream group 10 (Step S5).

When first profile determiner 11 obtains reference packet stream group 10, first profile determiner 11 selects one unselected reference packet stream from among reference packet streams included in reference packet stream group 10 (Step S10). Here, the unselected reference packet stream means a reference packet stream that has not been selected in the past process in Step S10 throughout the loop process from the process in Step S10 to the YES process in Step S55 (described later).

When first profile determiner 11 selects one unselected reference packet stream, first profile determiner 11 selects one unselected packet from among packets included in the selected reference packet stream (Step S15). Here, the unselected packet means a packet that has not been selected in the past process in Step S15 throughout the loop process from the process in Step S15 to the YES process in Step S35 (described later).

When first profile determiner 11 selects one packet, first profile determiner 11 checks whether or not the profile of the selected packet can be determined using the stored profile information (Step S20).

When the profile of the selected packet can be determined using the stored profile information in the process in Step S20 (Step S20: YES), first profile determiner 11 determines the profile of the selected packet using the stored profile information (Step S30).

When the profile of the selected packet cannot be determined using the stored profile information in the process in Step S20 (Step S20: NO), first profile determiner 11 specifies a protocol for the selected packet by executing an application including a deep packet inspection function (Step S25). Subsequently, first profile determiner 11 determines the profile of the selected packet on the basis of the specified protocol (Step S30).

When first profile determiner 11 determines the profile of the selected packet, first profile determiner 11 checks whether or not the packets included in the selected reference packet stream include an unselected packet (Step S35).

When there is an unselected packet in the process in Step S35 (Step S35: YES), the first reference feature amount extraction process proceeds to the process in Step S15.

When there is no unselected packet in the process in Step S35 (Step S35: NO), first extractor 12 extracts, as packet data, a bit string stored in the payload field of each packet the profile of which has been determined first profile determiner 11. Subsequently, first extractor 12 extracts a reference packet data stream made up of packet data having the same profile (Step S40).

Furthermore, reference packet data stream group storage 13 stores the reference packet data stream extracted by first extractor 12.

When the reference packet data stream is extracted, reference packet data distance calculator 14 calculates a plurality of reference distances between a plurality of reference packet data included in the reference packet data stream (Step S45).

When the plurality of reference distances are calculated, reference feature amount extractor 15 extracts, as a reference feature amount, the reference distance frequency distribution for each window from the plurality of calculated reference distances (Step S50). Subsequently, reference feature amount storage 16 stores the reference distance frequency distribution extracted by reference feature amount extractor 15 as the reference feature amount.

When the reference distance frequency distribution is extracted, first profile determiner 11 checks whether or not obtained reference packet stream group 10 includes an unselected reference packet stream (Step S55).

When there is an unselected reference packet stream in the process in Step S55 (Step S55: YES), the first reference feature amount extraction process returns to the process in Step S10.

When there is no unselected reference packet stream in the process in Step S55 (Step S55: NO), the first reference feature amount extraction process ends.

Next, the first abnormality detection process will be described.

The first abnormality detection process is a process of detecting an abnormality in detection target packet stream 20. For example, when a user of abnormality detection device 1 operates abnormality detection device 1 to start the first abnormality detection process, the first abnormality detection process starts.

Figure 16:
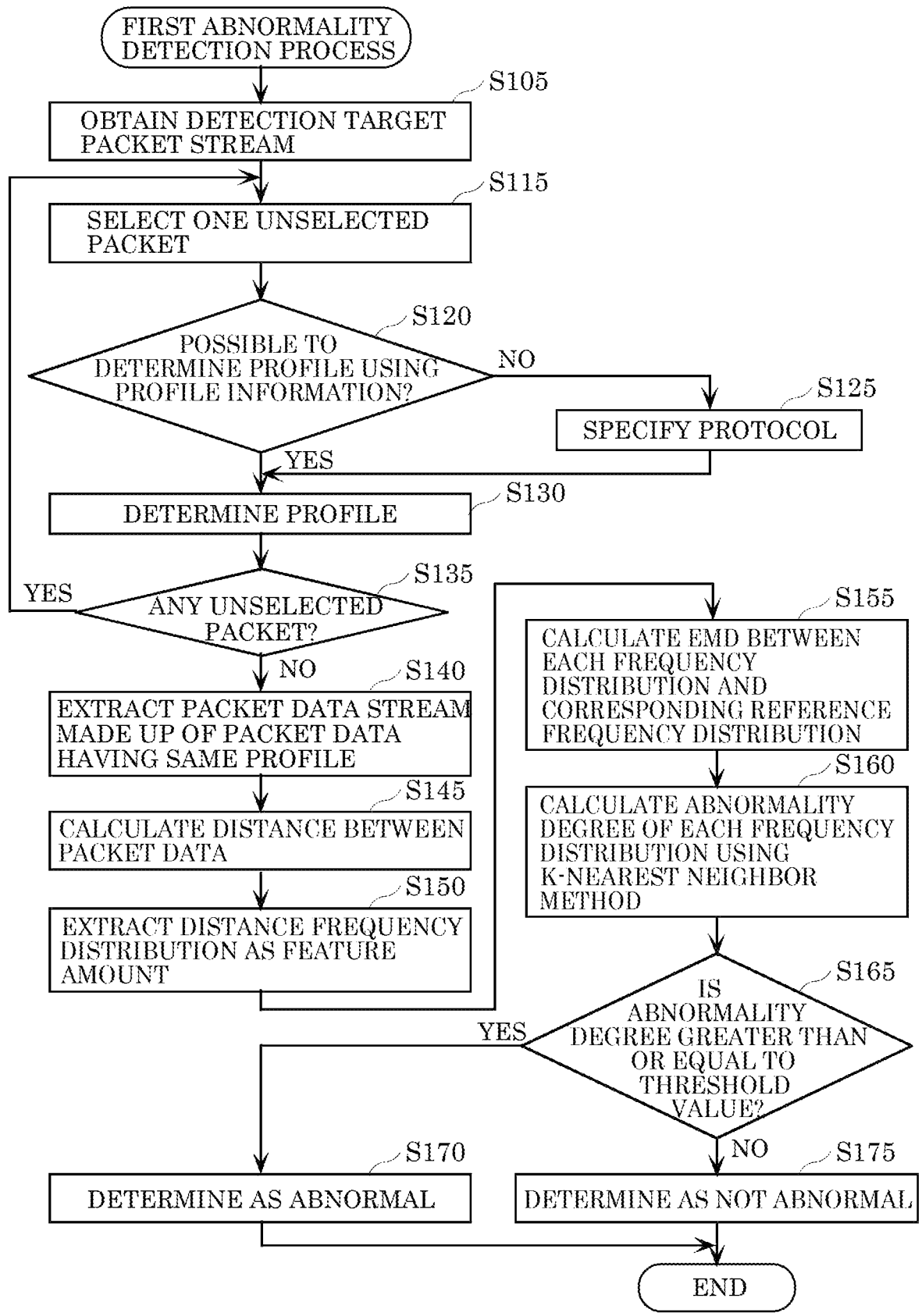
FIG. 16 is a flowchart of a first abnormality detection process.

FIG. 16 is a flowchart of the first abnormality detection process.

When the first abnormality detection process starts, second profile determiner 21 obtains detection target packet stream 20 (Step S105).

When second profile determiner 21 obtains detection target packet stream 20, second profile determiner 21 selects one unselected packet from among packets included in detection target packet stream 20 obtained (Step S115). Here, the unselected packet means a packet that has not been selected in the past process in Step S115 throughout the loop process from the process in Step S115 to the YES process in Step S135 (described later).

When second profile determiner 21 selects one packet, second profile determiner 21 checks whether or not the profile of the selected packet can be determined using the stored profile information (Step S120).

When the profile of the selected packet can be determined using the stored profile information in the process in Step S120 (Step S120: YES), second profile determiner 21 determines the profile of the selected packet using the stored profile information (Step S130).

When the profile of the selected packet cannot be determined using the stored profile information in the process in Step S120 (Step S120: NO), second profile determiner 21 specifies a protocol for the selected packet by executing an application including a deep packet inspection function (Step S125).

Subsequently, second profile determiner 21 determines the profile of the selected packet on the basis of the specified protocol (Step S130).

When second profile determiner 21 determines the profile of the selected packet, second profile determiner 21 checks whether or not the packets included in detection target packet stream 20 obtained include an unselected packet (Step S135).

When there is an unselected packet in the process in Step S135 (Step S135: YES), the first abnormality detection process proceeds to the process in Step S115.

When there is no unselected packet in the process in Step S135 (Step S135: NO), second extractor 22 extracts, as packet data, a bit string stored in the payload field of each packet the profile of which has been determined second profile determiner 21. Subsequently, second extractor 22 extracts a detection target packet data stream made up of packet data having the same profile (Step S140). Furthermore, detection target packet data stream group storage 23 stores the detection target packet data stream extracted by second extractor 22.

When the detection target packet data stream is extracted, detection target packet data distance calculator 24 calculates a plurality of distances between a plurality of detection target packet data included in the detection target packet data stream (Step S145).

When the plurality of distances are calculated, feature amount extractor 25 extracts, as a feature amount, the distance frequency distribution for each window from the plurality of calculated distances (Step S150).

Subsequently, feature amount storage 26 stores the distance frequency distribution extracted by feature amount extractor 25 as the feature amount.

When the distance frequency distribution is extracted, information calculator 27 calculates the earth mover's distance between each extracted distance frequency distribution and a corresponding one of the reference distance frequency distributions stored in reference feature amount storage 16 as the reference feature amount (Step S155), and calculates an abnormality degree, which indicates the degree of abnormality in detection target packet stream 20, using a k-nearest neighbor method in which the calculated earth mover's distance is used (Step S160).

When the abnormality degree is calculated, determined 28 checks whether or not the calculated abnormality degree is greater than or equal to the stored threshold value (Step S165).

When the calculated abnormality degree is greater than or equal to the stored threshold value in the process in Step S165 (Step S165: YES), determiner 28 determines that detection target packet stream 20 is abnormal (Step S170), and outputs, to the outside of determiner 28, a signal indicating that detection target packet stream 20 is abnormal.

When the calculated abnormality degree is not greater than or equal to the stored threshold value in the process in Step S165 (Step S165: NO), determiner 28 determines that detection target packet stream 20 is not abnormal (Step S175), and outputs, to the outside of determiner 28, a signal indicating that detection target packet stream 20 is not abnormal.

When the process in Step S170 ends and when the process in Step S175 ends, the first abnormality detection process ends.

[1-3. Review]

Abnormality detection device 1 having the above-described configuration performs the first reference feature amount extraction process and thus extracts, as the reference feature amount, a feature of the context of a normal packet stream from reference packet stream group 10 made up of normal packet streams, and stores the reference feature amount. Subsequently, abnormality detection device 1 performs the first abnormality detection process and thus extracts a feature of the context of detection target packet stream 20 as the feature amount from detection target packet stream 20, calculates an abnormality degree indicating the degree of deviation of the extracted feature amount from the stored reference feature amount, and determines, on the basis of the calculated abnormality degree, whether or not detection target packet stream 20 is abnormal. Thus, an abnormality in detection target packet stream 20 can be detected using abnormality detection device 1.

Embodiment 2

The following describes an abnormality detection device according to Embodiment 2, the configuration of which is partially different from that of abnormality detection device 1 according to Embodiment 1.

[2-1. Configuration]

Figure 17:
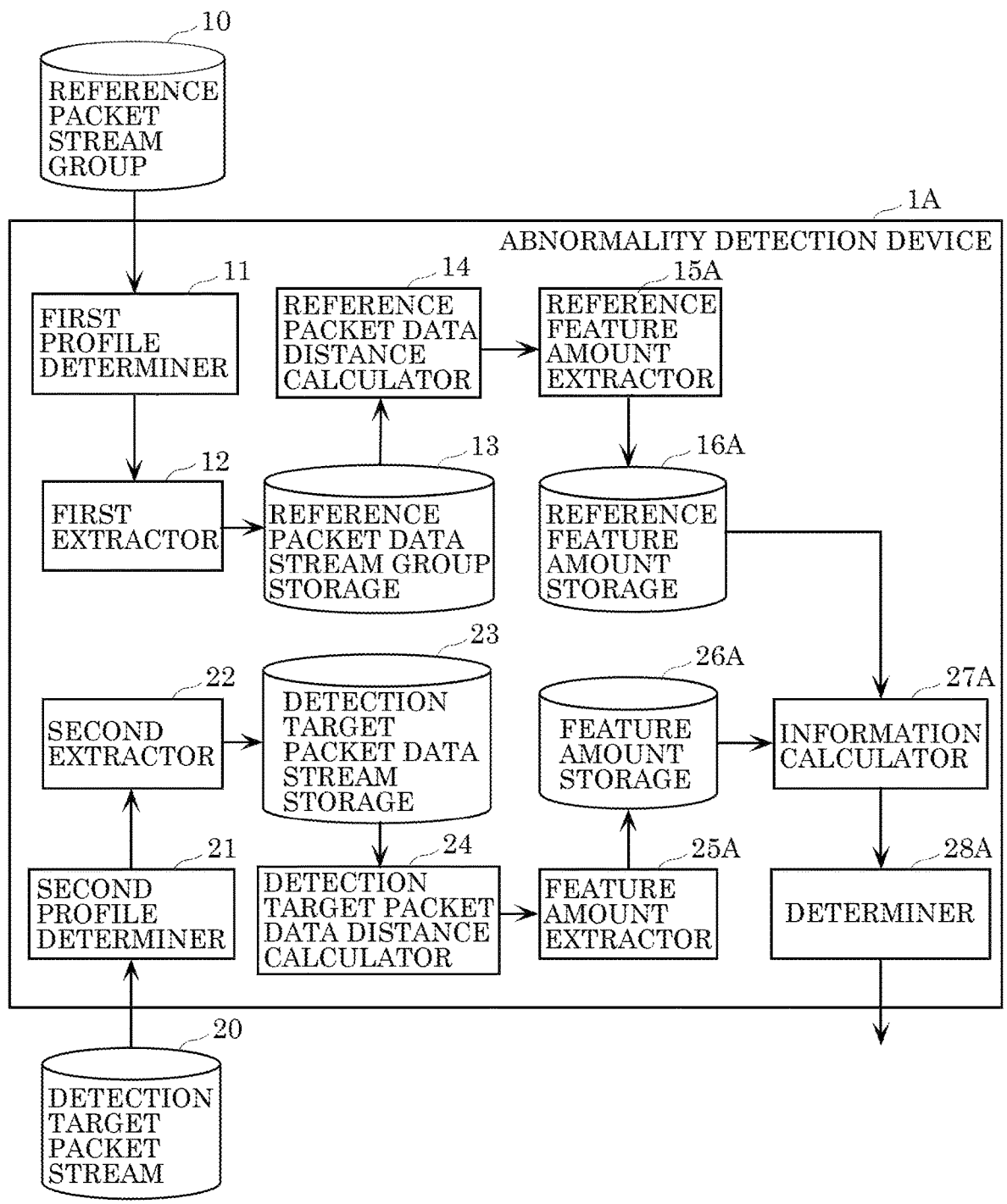
FIG. 17 is a block diagram illustrating the configuration of an abnormality detection device according to Embodiment 2.

FIG. 17 is a block diagram illustrating the configuration of abnormality detection device 1A according to Embodiment 2. Hereinafter, structural elements of abnormality detection device 1A that are substantially the same as those of abnormality detection device 1 according to Embodiment 1 will be assigned the same reference marks and detailed explanations thereof will be omitted assuming that the explanations have already been provided, and the description will focus on the points of difference from abnormality detection device 1.

As illustrated in FIG. 17, abnormality detection device 1A is configured by changing abnormality detection device 1, specifically, by changing reference feature amount extractor 15 into reference feature amount extractor 15A, changing reference feature amount storage 16 into reference feature amount storage 16A, changing feature amount extractor 25 into feature amount extractor 25A, changing feature amount storage 26 into feature amount storage 26A, changing information calculator 27 into information calculator 27A, and changing determiner 28 into determiner 28A.

For each reference packet data stream stored in reference packet data stream group storage 13, reference feature amount extractor 15A extracts a reference feature amount using a corresponding one of the plurality of reference distances calculated by reference packet data distance calculator 14. More specifically, for each reference packet data stream stored in reference packet data stream group storage 13, reference feature amount extractor 15A calculates a reference distance stream made up of a plurality of reference distances calculated for pairs of reference packet data belonging to each of one or more windows made up of W consecutive reference packet data (W is an integer greater than or equal to 2), and extracts each calculated reference distance stream as a reference feature amount.

Reference feature amount storage 16A stores the reference feature amounts extracted by reference feature amount extractor 15A.

For the detection target packet data stream stored in detection target packet data stream storage 23, feature amount extractor 25A extracts a feature amount using the plurality of distances calculated by detection target packet data distance calculator 24. More specifically, for the detection target packet data stream stored in detection target packet data stream storage 23, feature amount extractor 25A calculates a distance stream made up of a plurality of distances calculated for pairs of detection target packets belonging to each of one or more windows made up of W consecutive detection target packet data (W is an integer greater than or equal to 2), and extracts the calculated distance stream as a feature amount.

Feature amount storage 26A stores the feature amounts extracted by feature amount extractor 25A.

Information calculator 27A calculates a distance that is set by a warping (dynamic time warping) method (hereinafter also referred to as a "dynamic time warping distance" or a "DTW distance") between each of the reference distance streams stored in reference feature amount storage 16A as the reference feature amount and each of the distance streams stored in feature amount storage 26A as the feature amount, and calculates an abnormality degree, which indicates the degree of abnormality in detection target packet stream 20, using the calculated dynamic time warping distance.

The dynamic time warping distance is a distance that can be set between two time-series data (here, between the reference distance stream and the distance stream). The dynamic time warping distance is defined as the sum of the distances in a path having the smallest sum of elements thereon among paths in which, when there are two time-series data x and y (the number of elements in x is n where n is an integer greater than or equal to 2 and the number of elements in y is m where m is an integer greater than or equal to 2), in a matrix where a (i, j) element indicates the distance between xi and yj, the movement from the (i, j) element to any of elements (i+1, j), (j+1), and (i+1, j+1) is repeated to reach a (n, m) element, in such a manner as to satisfy the constraint that the number of row elements is less than or equal to n and the number of column elements is less than or equal to m.

Figure 18:
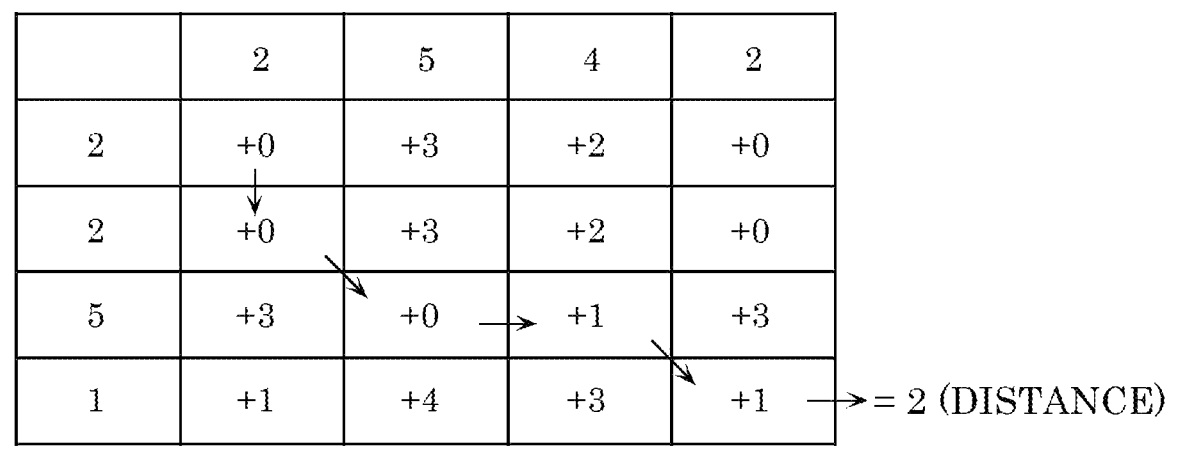

FIG. 18 is a schematic diagram illustrating one example where information calculator 27A calculates the dynamic time warping distance between a reference distance stream made up of time-series data "2", "5", "4", and "2" and a distance stream made up of time-series data "2", "2", "5", and "1".

Information calculator 27A calculates a distance matrix in FIG. 18 that is made up of distances (differences) of values at respective points in time between the reference distance stream and the distance stream. Subsequently, information calculator 27A determines, by calculation, that in the calculated distance matrix, the sum of distances "0", "0", "0", "1", and "1", that is, "2", in the path of sequential movement of "one cell down", "one cell down", "diagonally one cell down to the right", "one cell to the right", and "diagonally one cell down to the right" from the upper left distance position is smallest among the sums of distances in all paths of movement. Furthermore, information calculator 27A calculates "2" as the dynamic time warping distance between the reference distance stream made up of time-series data "2", "5", "4", and "2" and a distance stream made up of time-series data "2", "2", "5", and "1".

Using the above-described dynamic time warping distance calculation method, information calculator 27A calculates the dynamic time warping distance between each of the reference distance streams stored in reference feature amount storage 16A and each of the distance streams stored in feature amount storage 26A, and calculates the largest value of the calculated dynamic time warping distances as the abnormality degree of detection target packet stream 20.

On the basis of the abnormality degree of detection target packet stream 20 that has been calculated by information calculator 27A, determiner 28A determines whether or not detection target packet stream 20 is abnormal. Subsequently, determiner 28A outputs the determination result to the outside of determiner 28A. For example, determiner 28A may store a threshold value, and when the abnormality degree of detection target packet stream 20 is greater than or equal to the threshold value, determiner 28A may determine that detection target packet stream 20 is abnormal, and when the abnormality degree of detection target packet stream 20 is less than the threshold value, determiner 28A may determine that detection target packet stream 20 is not abnormal. Furthermore, determiner 28A may store, for each profile that is subject to the determination of first profile determiner 11 and second file profile determiner 21, a threshold value that is a mutually independent value, and may perform the above determination using the threshold value corresponding to the profile of a detection target packet extracted from detection target packet stream 20.

[2-2. Operations]

Abnormality detection device 1A having the above configuration performs the second reference feature amount extraction process the content of which is partially different from that of the first reference feature amount extraction process according to Embodiment 1 and the second abnormality detection process the content of which is partially different from that of the first abnormality detection process according to Embodiment 1. These processes will be described below with reference to the drawings.

First, the second reference feature amount extraction process will be described.

Figure 19:
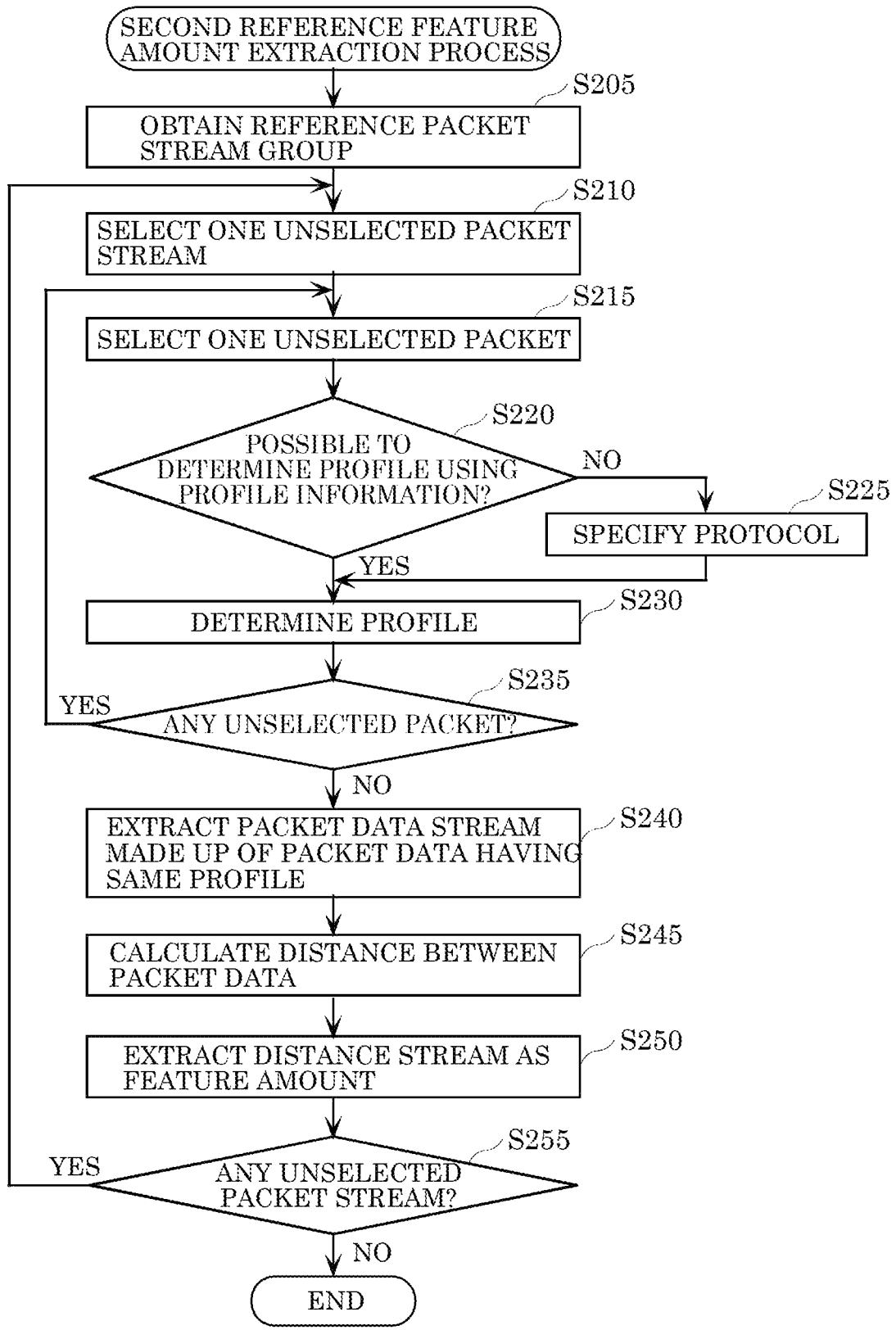
FIG. 19 is a flowchart of a second reference feature amount extraction process.

FIG. 19 is a flowchart of the second reference feature amount extraction process.

Among the processes illustrated in FIG. 19, the process in Step S205 to the process in Step S245 and the process in Step S255 are substantially the same as the process in Step S5 to the process in Step S45 and the process in Step S55 (refer to FIG. 15, etc.) in the first reference feature amount extraction process according to Embodiment 1, respectively. Therefore, detailed explanations of the process in Step S205 to the process in Step S245 and the process in Step S255 will be omitted assuming that the explanations have already been provided, and the description will focus on the process in Step S250.

When a plurality of reference distances are calculated in the process in Step S245, reference feature amount extractor 15A extracts, as a reference feature amount, a reference distance stream made up of the plurality of calculated reference distances for each window (Step S250). Subsequently, reference feature amount storage 16A stores the reference distance stream extracted by reference feature amount extractor 15A as the reference feature amount.

When the process in Step S250 ends, the second reference feature amount extraction process proceeds to the process in Step S255.

Next, the second abnormality detection process will be described.

Figure 20:
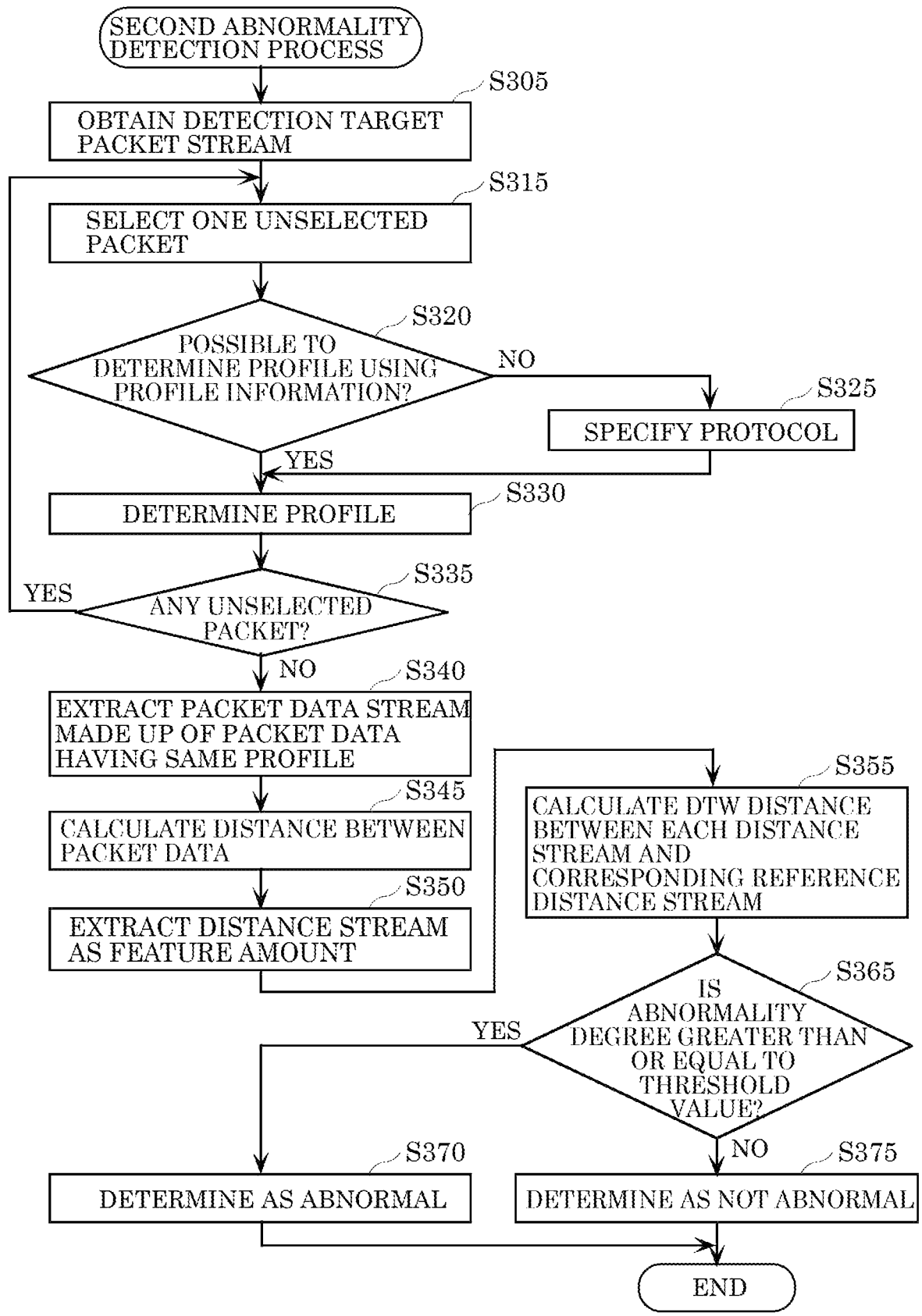
FIG. 20 is a flowchart of a second abnormality detection process.

FIG. 20 is a flowchart of the second abnormality detection process.

Among the processes illustrated in FIG. 20, the process in Step S305 to the process in Step S345 are substantially the same as the process in Step S105 to the process in Step S145 in the first abnormality detection process according to Embodiment 1, respectively. The process in Step S365 to the process in Step S375 are substantially the same as processes resulting from replacing determiner 28 by determiner 28A in the process in Step S165 to the process in Step S175 in the first abnormality detection process according to Embodiment 1. Therefore, detailed explanations of the process in Step S305 to the process in Step S345 and the process in Step S365 to the process in Step S375 will be omitted assuming that the explanations have already been provided, and the description will focus on the process in Step S350 to the process in Step S355.

When a plurality of distances are calculated in the process in Step S345, feature amount extractor 25A extracts, as a feature amount, a distance stream made up of the plurality of calculated distances for each window (Step S350). Subsequently, feature amount storage 26A stores the distance stream extracted by feature amount extractor 25A as the feature amount.

When the distance stream is extracted, information calculator 27A calculates a dynamic time warping distance between each of the extracted distance streams and a corresponding one of the reference distance streams stored in reference feature amount storage 16A as the reference feature amount, and calculates an abnormality degree, which indicates the degree of abnormality in detection target packet stream 20, using the dynamic time warping distance (Step S355).

When the process in Step S355 ends, the second reference abnormality detection process proceeds to the process in Step S365.

[2-3. Review]

Abnormality detection device 1A having the above-described configuration performs the second reference feature amount extraction process and thus extracts, as the reference feature amount, a feature of the context of a normal packet stream from reference packet stream group 10 made up of normal packet streams, and stores the reference feature amount. Subsequently, abnormality detection device 1A performs the second abnormality detection process and thus extracts a feature of the context of detection target packet stream 20 as the feature amount from detection target packet stream 20, calculates an abnormality degree indicating the degree of deviation of the extracted feature amount from the stored reference feature amount, and determines, on the basis of the calculated abnormality degree, whether or not detection target packet stream 20 is abnormal. Thus, an abnormality in detection target packet stream 20 can be detected using abnormality detection device 1A, as with abnormality detection device 1 according to Embodiment 1.

Embodiment 3

Figure 21:
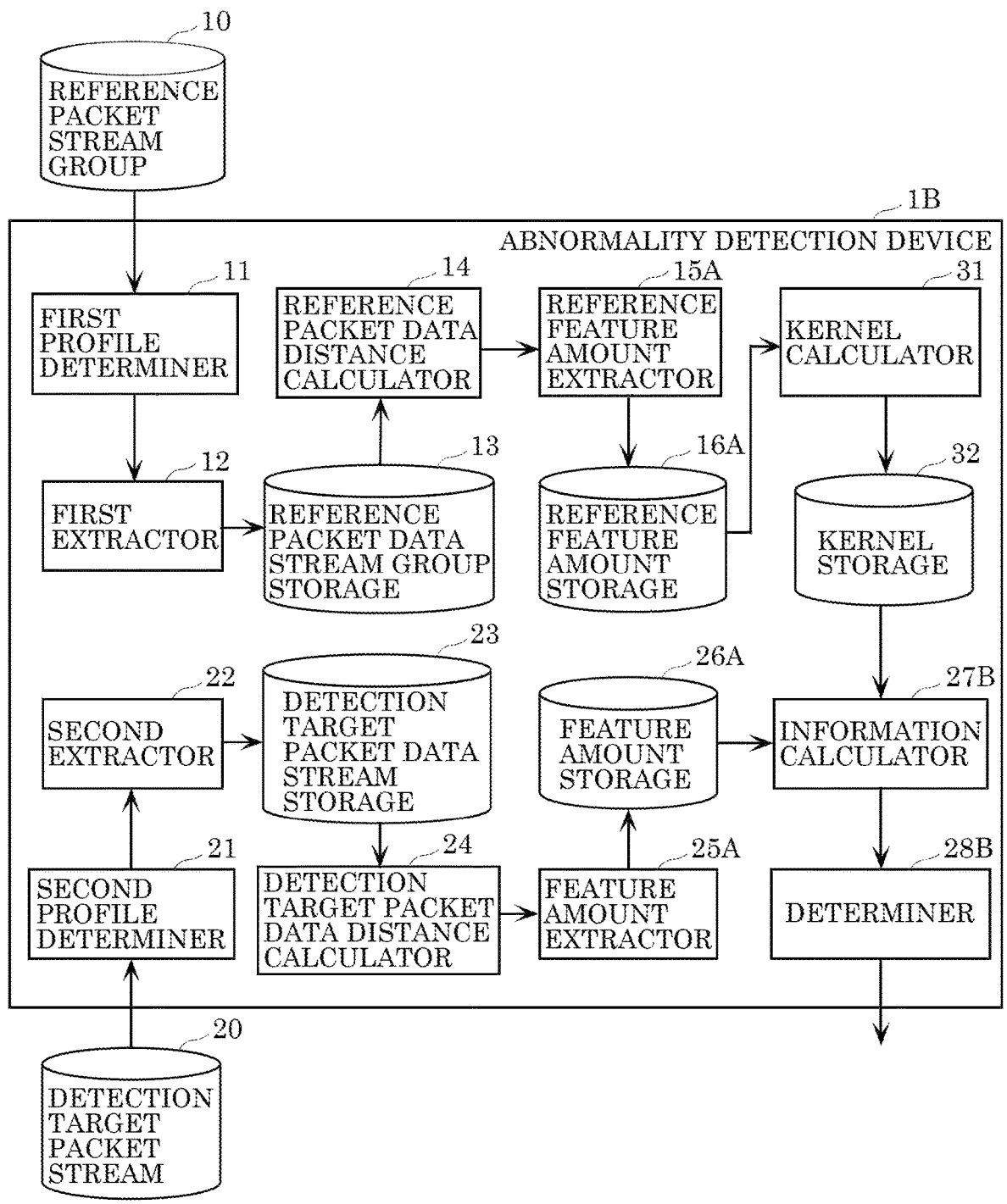
FIG. 21 is a block diagram illustrating the configuration of an abnormality detection device according to Embodiment 3.

The following describes an abnormality detection device according to Embodiment 3, the configuration of which is partially different from that of abnormality detection device 1A according to Embodiment 2.
[3-1. Configuration]
FIG. 21 is a block diagram illustrating the configuration of abnormality detection device 1B according to Embodiment 3. Hereinafter, structural elements of abnormality detection device 1B that are substantially the same as those of abnormality detection device 1A according to Embodiment 2 will be assigned the same reference marks and detailed explanations thereof will be omitted assuming that the explanations have already been provided, and the description will focus on the points of difference from abnormality detection device 1A.

As illustrated in FIG. 20, abnormality detection device 1B is configured by changing abnormality detection device 1A, specifically, by changing information calculator 27A into information calculator 27B, changing determiner 28A into determiner 28B, and adding kernel calculator 31 and kernel storage 32.

Kernel calculator 31 calculates a global alignment kernel (refer to Cuturi, M., Vert, J. P., Birkenes, O., & Matsui, T. (2007, April). A kernel for time series based on global alignments. In Acoustics, Speech and Signal Processing, 2007. ICASSP 2007. IEEE International Conference on (Vol. 2, pp. II-413). IEEE (NPL 3)) using each reference distance stream stored in reference feature amount storage 16A as the reference feature amount. For example, kernel calculator 31 may calculate the global alignment kernel by applying unsupervised learning to a one-class support vector machine (SVM), which is a machine-learning model, using each reference distance stream stored in reference feature amount storage 16A.

Kernel storage 32 stores the global alignment kernel calculated by kernel calculator 31.

Information calculator 27B calculates an outlier for each distance stream stored in feature amount storage 26A as the feature amount by applying, to the distance stream, the global alignment kernel stored in kernel storage 32, and calculates the largest value of the calculated outliers as the abnormality degree of detection target packet stream 20.

On the basis of the abnormality degree of detection target packet stream 20 that has been calculated by information calculator 27B, determiner 28B determines whether or not detection target packet stream 20 is abnormal. Subsequently, determiner 28B outputs the determination result to the outside of determiner 28B. For example, determiner 28B may store a threshold value, and when the abnormality degree of detection target packet stream 20 is greater than or equal to the threshold value, determiner 28B may determine that detection target packet stream 20 is abnormal, and when the abnormality degree of detection target packet stream 20 is less than the threshold value, determiner 28B may determine that detection target packet stream 20 is not abnormal. Furthermore, determiner 28B may store, for each profile that is subject to the determination of first profile determiner 11 and second file profile determiner 21, a threshold value that is a mutually independent value, and may perform the above determination using the threshold value corresponding to the profile of a detection target packet extracted from detection target packet stream 20.
[3-2. Operations]
Abnormality detection device 1B having the above configuration performs the third reference feature amount extraction process the content of which is partially different from that of the second reference feature amount extraction process according to Embodiment 2 and the third abnormality detection process the content of which is partially different from that of the second abnormality detection process according to Embodiment 2. These processes will be described below with reference to the drawings.

First, the third reference feature amount extraction process will be described.

Figure 22:
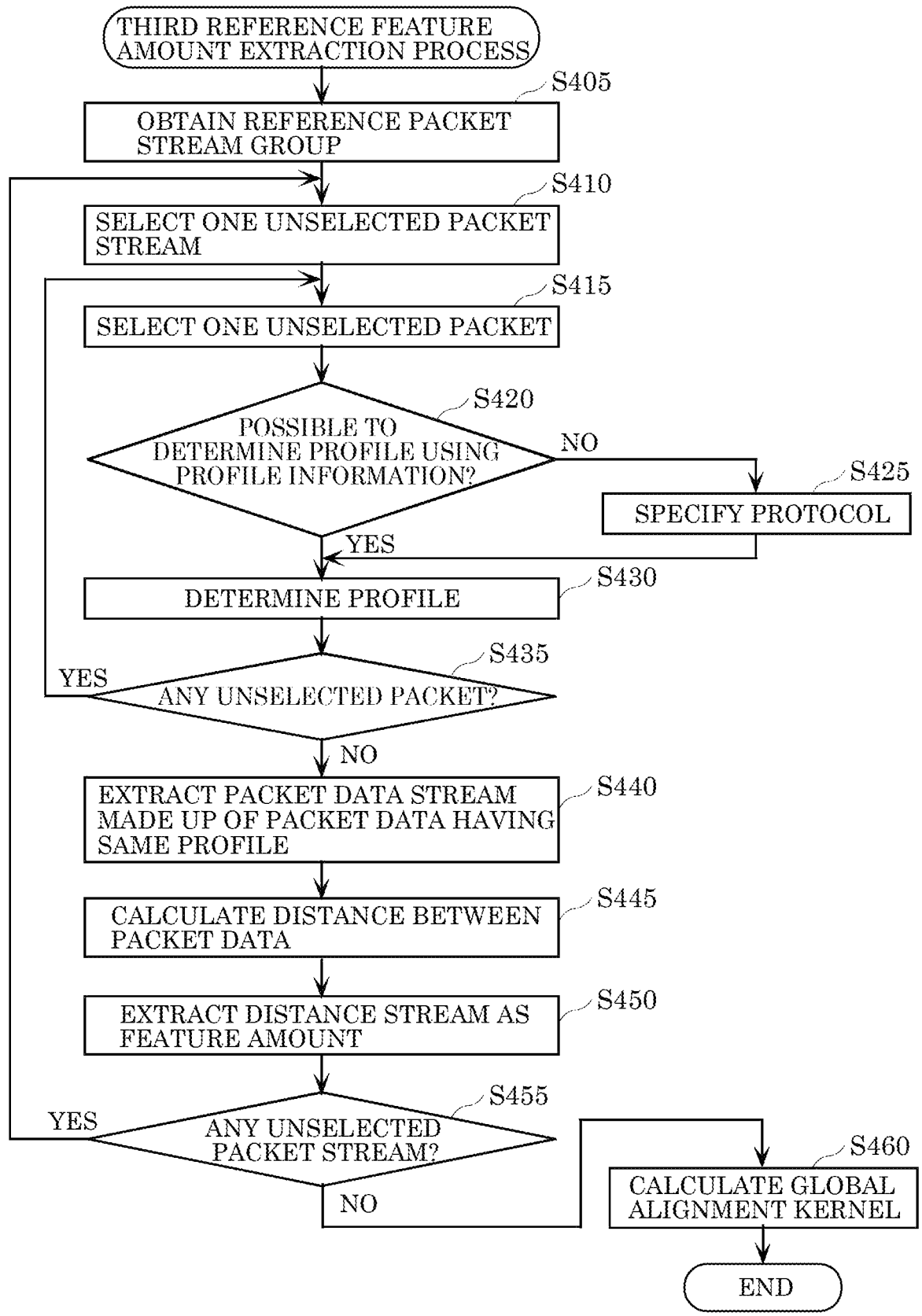
FIG. 22 is a flowchart of a third reference feature amount extraction process.

FIG. 22 is a flowchart of the third reference feature amount extraction process.

Among the processes illustrated in FIG. 22, the process in Step S405 to the process in Step S455 are substantially the same as the process in Step S205 to the process in Step S255 (refer to FIG. 19, etc.) in the second reference feature amount extraction process according to Embodiment 2, respectively. Therefore, detailed explanations of these processes will be omitted assuming that the explanations have already been provided, and the description will focus on the process in Step S460.

When there is no unselected reference packet stream in the process in Step S455 (Step S455: NO), kernel calculator 31 calculates a global alignment kernel using each reference distance stream stored in reference feature amount storage 16A as the reference feature amount (Step S460). Subsequently, kernel storage 32 stores the global alignment kernel calculated by kernel calculator 31.

When the process in Step S460 ends, the third reference feature amount extraction process ends.

Next, the third abnormality detection process will be described.

Figure 23:
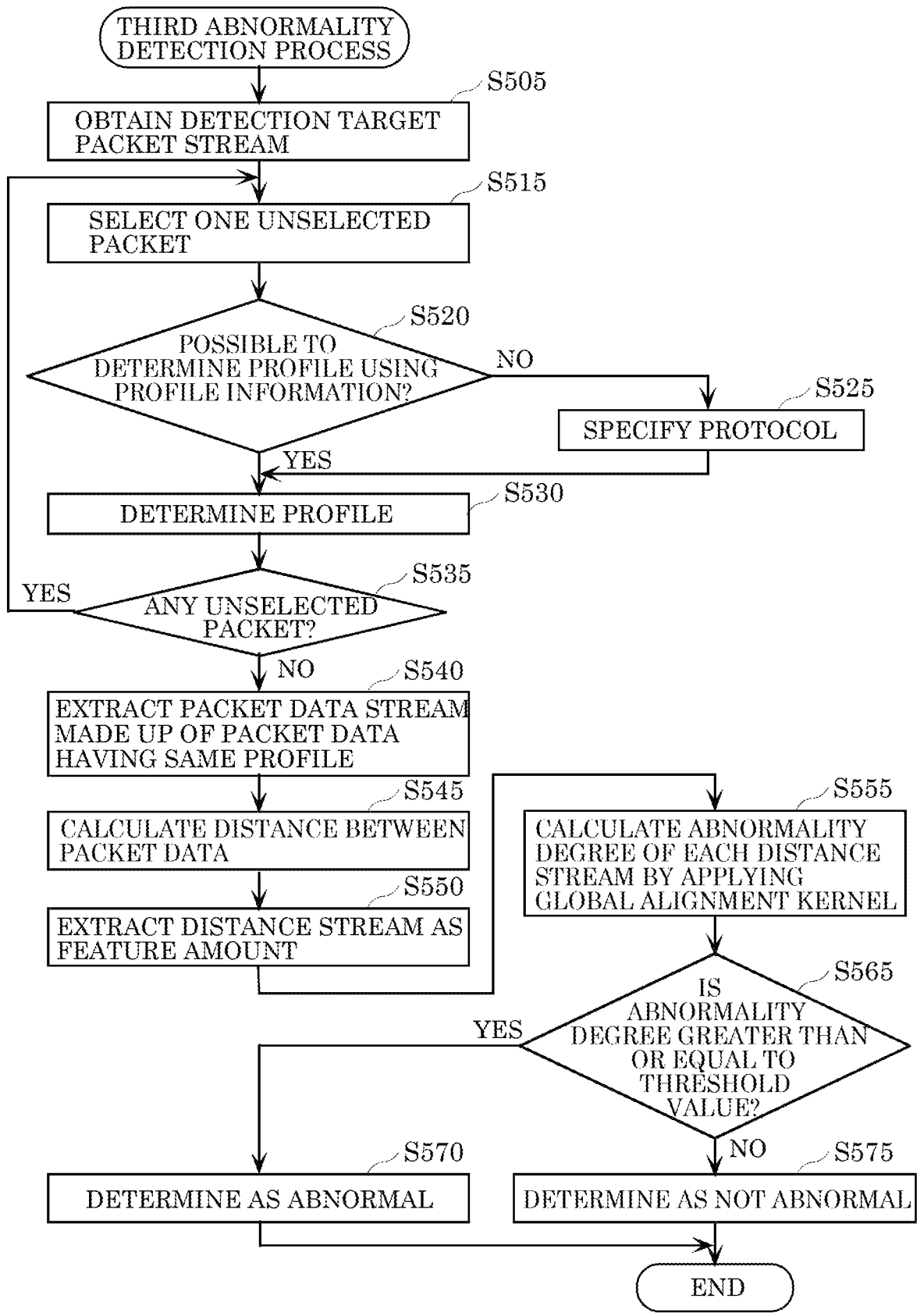
FIG. 23 is a flowchart of a third abnormality detection process.

FIG. 23 is a flowchart of the third abnormality detection process.

Among the processes illustrated in FIG. 23, the process in Step S505 to the process in Step S550 are substantially the same as the process in Step S305 to the process in Step S350 in the second abnormality detection process according to Embodiment 2, respectively. The process in Step S565 to the process in Step S575 are substantially the same as processes resulting from replacing determiner 28A by determiner 28B in the process in Step S365 to the process in Step S375 in the second abnormality detection process according to Embodiment 2. Therefore, detailed explanations of the process in Step S505 to the process in Step S550 and the process in Step S565 to the process in Step S575 will be omitted assuming that the explanations have already been provided, and the description will focus on the process in Step S555.

When the distance stream is extracted as the feature amount in the process in Step S550, information calculator 27B calculates an outlier for each extracted distance stream by applying, to the distance stream, the global alignment kernel stored in kernel storage 32, and calculates the largest value of the calculated outliers as the abnormality degree of detection target packet stream 20.

When the process in Step S555 ends, the third reference abnormality detection process proceeds to the process in Step S565.

[3-3. Review]

Abnormality detection device 1B having the above-described configuration performs the third reference feature amount extraction process and thus extracts, as the reference feature amount, a feature of the context of a normal packet stream from reference packet stream group 10 made up of normal packet streams, and stores the reference feature amount. Subsequently, abnormality detection device 1B performs the third abnormality detection process and thus extracts a feature of the context of detection target packet stream 20 as the feature amount from detection target packet stream 20, calculates an abnormality degree indicating the degree of deviation of the extracted feature amount from the stored reference feature amount, and determines, on the basis of the calculated abnormality degree, whether or not detection target packet stream 20 is abnormal. Thus, an abnormality in detection target packet stream 20 can be detected using abnormality detection device 1B, as with abnormality detection device 1 according to Embodiment 1 and abnormality detection device 1A according to Embodiment 2.

(Additional Comments)

As described above, Embodiments 1 to 3 are presented as exemplifications of the technique disclosed in the present application. However, the technique in the present disclosure is not limited to these embodiments, and is also applicable to an embodiment obtained by carrying out modification, substitution, addition, omission, etc., as necessary.

Examples of a variation of the present disclosure include the following.

(1) Embodiment 1 describes an example in which reference packet data distance calculator 14 is configured to calculate, for each pair of reference packets that are N packets apart from each other, the plurality of reference distances between the plurality of reference packet data included in the reference packet data stream. Regarding this feature, as another configuration example, reference packet data distance calculator 14 may further calculate, for each pair of reference packets that are L packets apart from each other (L is an integer greater than or equal to 1 and different from N), a plurality of reference distances between a plurality of reference packet data included in a reference packet data stream. In this case, detection target packet data distance calculator 24 is configured to calculate a distance using an algorithm that is substantially the same as that used by reference packet data distance calculator 14 in the above other configuration example, specifically, further configured to calculate, for each pair of reference packets that are L packets apart from each other, a plurality of reference distances between a plurality of detection target packet data included in a detection target packet data stream.

(2) Embodiment 1 describes an example in which abnormality detection device 1 is configured so that determiner 29 determines whether or not detection target packet stream 20 is abnormal, and outputs the determination result to the outside of determiner 29. Regarding this feature, as another configuration example, abnormality detection device 1 may be configured so that information calculator 27 calculates an abnormality degree indicating the degree of abnormality in detection target packet stream 20, and outputs the calculated abnormality degree to the outside of information calculator 27. In this case, abnormality detection device 1 may be configured to not include determiner 29.

(3) Embodiment 1 describes an example in which abnormality detection device 1 is configured to perform the first reference feature amount extraction process and thus extract a reference feature amount and store the extracted reference feature amount in reference feature amount extractor 15. Regarding this feature, as another configuration example, abnormality detection device 1 may obtain, to the outside thereof, the reference feature amount extracted by an external device or the like, and store the obtained reference feature amount in reference feature amount storage 16 in advance. In this case, abnormality detection device 1 does not need to perform the first reference feature amount extraction process and may be configured to not include first profile determiner 11, first extractor 12, reference packet data stream group storage 13, reference packet data distance calculator 14, or reference feature amount extractor 15. As yet another configuration example, abnormality detection device 1 may be manufactured in the state where the reference feature amount is stored in reference feature amount storage 16 in advance. In this case, abnormality detection device 1 does not need to perform the first reference feature amount extraction process and may be configured to not include first profile determiner 11, first extractor 12, reference packet data stream group storage 13, reference packet data distance calculator 14, or reference feature amount extractor 15.

(4) Embodiment 3 describes an example in which abnormality detection device 1B is configured to perform the third reference feature amount extraction process and thus calculate a global alignment kernel and store the calculated global alignment kernel in kernel storage 32. Regarding this feature, as another configuration example, abnormality detection device 1B may be configured to obtain, from the outside thereof, the global alignment kernel extracted by an external device or the like, and store the obtained global alignment kernel in kernel storage 32 in advance. In this case, abnormality detection device 1B does not need to perform the third reference feature amount extraction process and may be configured to not include first profile determiner 11, first extractor 12, reference packet data stream group storage 13, reference packet data distance calculator 14, reference feature amount extractor 15A, reference feature amount storage 16A, or kernel calculator 31. As yet another configuration example, abnormality detection device 1B may be manufactured in the state where the global alignment kernel is stored in kernel storage 32 in advance. In this case, abnormality detection device 1B does not need to perform the third reference feature amount extraction process and may be configured to not include first profile determiner 11, first extractor 12, reference packet data stream group storage 13, reference packet data distance calculator 14, reference feature amount extractor 15A, reference feature amount storage 16A, or kernel calculator 31.

(5) Embodiment 3 describes an example in which abnormality detection device 1B is configured so that information calculator 27B calculates an outlier for each distance stream stored as a feature amount, by applying, to the distance stream, the global alignment kernel stored in kernel storage 32, and calculates the largest value of the calculated outliers as the abnormality degree of detection target packet stream 20. Regarding this feature, as another configuration example, abnormality detection device 1B may be configured so that information calculator 27B calculates, for each distance stream, an outlier indicating a binary value of whether or not there is an abnormality, and when the calculated outliers include an outlier indicating that there is an abnormality, outputs, to the outside of information calculator 27B, a signal indicating that detection target packet stream 20 is abnormal. In this case, abnormality detection device 1B may be configured to not include determiner 28B.

(6) In Embodiment 1, each structural element in abnormality detection device 1 may be individually configured into a single chip, or some or all of the structural elements may be configured into a single chip, using a semiconductor device such as an integrated circuit (IC) and a large scale integrated circuit (LSI). Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used. In addition, depending on the emergence of circuit integration technology that replaces the LSI due to progress in semiconductor technology or other derivative technology, it is obvious that such technology may be used to integrate the function blocks. Possibilities in this regard include the application of biotechnology and the like.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely applicable in systems that use packets.

What is claimed is:

1. An abnormality detection method, comprising:
    calculating, for a detection target packet stream made up of a plurality of detection target packets that are consecutive, a plurality of distances between the plurality of detection target packets;
    extracting a feature amount of the detection target packet stream using the plurality of distances calculated; and
    calculating information about a degree of abnormality in the detection target packet stream using the feature amount extracted, wherein
    in the calculating of the plurality of distances, a Levenshtein distance between payloads of the plurality of detection target packets is used to calculate the plurality of distances,
    the Levenshtein distance between the payloads of the plurality of detection target packets is calculated for each pair of detection target packets that are N packets apart from each other in the detection target packet stream, and the calculation is applied in units of M bits to at least a portion of bit strings included in the payloads, N being an integer greater than or equal to 1, M being an integer between 1 and 16, inclusive,
    in the calculating of the plurality of distances, a distance for each pair of detection target packets that are N packets apart from each other in the detection target packet stream is calculated to calculate the plurality of distances, and
    in the extracting of the feature amount, for each of one or more windows made up of W consecutive detection target packets in the detection target packet stream, a frequency distribution of the plurality of distances calculated for pairs of detection target packets belonging to the window is calculated, and the frequency distribution calculated is extracted as the feature amount, W being an integer greater than or equal to 2.

2. The abnormality detection method according to claim 1, wherein
    the Levenshtein distance between the payloads of the plurality of detection target packets is further calculated for each pair of detection target packets that are L packets apart from each other in the detection target packet stream, L being an integer greater than or equal to 1 and different from N, and
    in the calculating of the plurality of distances, a distance for each pair of detection target packets that are L packets apart from each other in the detection target packet stream is calculated to calculate the plurality of distances.

3. The abnormality detection method according to claim 1, wherein
    in the calculating of the information about the degree of abnormality, an earth mover's distance between the frequency distribution calculated and each of a plurality of reference frequency distributions stored in advance is calculated, and a k-nearest neighbor method in which the earth mover's distance calculated is used is used to calculate the information about the degree of abnormality.

4. The abnormality detection method according to claim 1, wherein
    in the calculating of the plurality of distances, a plurality of distances between limited pairs of the plurality of detection target packets are calculated, the limited pairs being detection target packets of an identical command type.

5. The abnormality detection method according to claim 1, further comprising:
    calculating, for each of one or more reference packet streams made up of a plurality of reference packets that are consecutive, each of a plurality of reference distances between the plurality of reference packets; and
    extracting a reference feature amount of each of the one or more reference packet streams using a corresponding one of the plurality of reference distances calculated, wherein
    in the calculating of the information about the degree of abnormality in the detection target packet stream, the reference feature amount extracted is additionally used to calculate the information about the degree of abnormality in the detection target packet stream.

6. The abnormality detection method according to claim 5, wherein in the calculating of each of the plurality of reference distances, a Levenshtein distance between payloads of the plurality of reference packets is used to calculate each of the plurality of reference distances.

7. The abnormality detection method according to claim 6, wherein
the Levenshtein distance between the payloads of the plurality of reference packets is calculated for each pair of reference packets that are N packets apart from each other in each of the one or more reference packet streams, and the calculation is applied in units of M bits to at least a portion of bit strings included in the payloads, N being an integer greater than or equal to 1, M being an integer between 1 and 16, inclusive, and
in the calculating of each of the plurality of reference distances, a reference distance for each pair of reference packets that are N packets apart from each other in each of the one or more reference packet streams is calculated to calculate each of the plurality of reference distances.

8. The abnormality detection method according to claim 7, wherein
the Levenshtein distance between the payloads of the plurality of reference packets is further calculated for each pair of detection target packets that are L packets apart from each other in each of the one or more reference packet streams, L being an integer greater than or equal to 1 and different from N, and
in the calculating of each of the plurality of reference distances, a reference distance for each pair of reference packets that are L packets apart from each other in each of the one or more reference packet streams is further calculated to calculate each of the plurality of reference distances.

9. The abnormality detection method according to claim 3, further comprising:
calculating, for each of one or more reference packet streams made up of a plurality of reference packets that are consecutive, each of a plurality of reference distances between the plurality of reference packets; and
extracting, using each of the plurality of reference distances calculated, a reference feature amount of a corresponding one of the one or more reference packet streams, wherein
in the calculating of each of the plurality of reference distances, a Levenshtein distance between payloads of the plurality of reference packets is used to calculate each of the plurality of reference distances,
the Levenshtein distance between the payloads of the plurality of reference packets is calculated for each pair of reference packets that are N packets apart from each other in each of the one or more reference packet streams, and the calculation is applied in units of M bits to at least a portion of bit strings included in the payloads, N being an integer greater than or equal to 1, M being an integer between 1 and 16, inclusive, and
in the extracting of the reference feature amount of each of the one or more reference packet streams, for each of one or more windows made up of W consecutive reference packets in each of the one or more reference packet streams, a frequency distribution of the plurality of reference distances calculated for pairs of reference packets belonging to the window is calculated, the frequency distribution of the plurality of reference distances calculated is extracted as the reference feature amount of the reference packet stream, and the reference feature amount of the reference packet stream that has been extracted is stored as a corresponding one of the plurality of reference frequency distributions stored in advance, W being an integer greater than or equal to 2.

10. The abnormality detection method according to claim 5, wherein
in the calculating of each of the plurality of reference distances, reference distances between limited pairs of the plurality of reference packets are calculated, the limited pairs being reference packets of an identical command type.

11. An abnormality detection device, comprising:
a processor; and
memory including at least one set of instructions that, when executed by the processor, causes the processor to perform operations including:
calculating, for a detection target packet stream made up of a plurality of detection target packets that are consecutive, a plurality of distances between the plurality of detection target packets;
extracting a feature amount of the detection target packet stream using the plurality of distances calculated; and
calculating information about a degree of abnormality in the detection target packet stream using the feature amount extracted, wherein
in the calculating of the plurality of distances, a Levenshtein distance between payloads of the plurality of detection target packets is used to calculate the plurality of distances,
the Levenshtein distance between the payloads of the plurality of detection target packets is calculated for each pair of detection target packets that are N packets apart from each other in the detection target packet stream, and the calculation is applied in units of M bits to at least a portion of bit strings included in the payloads, N being an integer greater than or equal to 1, M being an integer between 1 and 16, inclusive,
in the calculating of the plurality of distances, a distance for each pair of detection target packets that are N packets apart from each other in the detection target packet stream is calculated to calculate the plurality of distances, and
in the extracting of the feature amount, for each of one or more windows made up of W consecutive detection target packets in the detection target packet stream, a frequency distribution of the plurality of distances calculated for pairs of detection target packets belonging to the window is calculated, and the frequency distribution calculated is extracted as the feature amount, W being an integer greater than or equal to 2.

12. The abnormality detection device according to claim 11, wherein
the operations further include:
calculating, for each of one or more reference packet streams made up of a plurality of reference packets that are consecutive, each of a plurality of reference distances between the plurality of reference packets; and
extracting a reference feature amount of each of the one or more reference packet streams using a corresponding one of the plurality of reference distances calculated, and
the processor additionally uses the reference feature amount extracted, to calculate the information about the degree of abnormality in the detection target packet stream.

* * * * *